United States Patent
Tabata

(10) Patent No.: US 7,131,933 B2
(45) Date of Patent: Nov. 7, 2006

(54) VEHICLE CONTROL APPARATUS HAVING MEANS FOR CHANGING INERTIA TORQUE OF ENGINE DURING SHIFTING ACTION OR DURING SWITCHING OF OPERATING STATE OF LOCK-UP CLUTCH

(75) Inventor: Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/281,217

(22) Filed: Oct. 28, 2002

(65) Prior Publication Data

US 2003/0109357 A1    Jun. 12, 2003

(30) Foreign Application Priority Data

Dec. 7, 2001    (JP)    ............... 2001-374860

(51) Int. Cl.
B60W 10/02    (2006.01)
B60W 10/04    (2006.01)

(52) U.S. Cl. ....................... 477/181; 477/109
(58) Field of Classification Search ................. 477/1.7, 477/109, 113, 102, 181; 123/90.11, 90.15
See application file for complete search history.

(56) References Cited

U.S. PATENT DOCUMENTS

| | | | | |
|---|---|---|---|---|
| 4,905,544 A | * | 3/1990 | Ganoung | ............... 477/109 |
| 5,056,378 A | * | 10/1991 | Aimone et al. | ............... 477/109 |
| 5,133,227 A | * | 7/1992 | Iwatsuki | ............... 477/110 |
| 5,184,577 A | * | 2/1993 | Kato et al. | ............... 477/109 |
| 5,611,754 A | * | 3/1997 | Haga et al. | ............... 477/181 |
| 5,785,627 A | * | 7/1998 | Uno et al. | ............... 477/109 |
| 5,807,209 A | * | 9/1998 | Matsubara et al. | ......... 477/176 |
| 5,865,709 A | * | 2/1999 | Tamura et al. | ............... 477/181 |
| 5,947,863 A | * | 9/1999 | Grob et al. | ............... 477/109 |
| 6,042,507 A | * | 3/2000 | Genise et al. | ............... 477/181 |
| 6,067,494 A | * | 5/2000 | Noda et al. | ............... 477/109 |
| 6,192,857 B1 | * | 2/2001 | Shimada | ............... 123/322 |
| 6,364,811 B1 | * | 4/2002 | Hubbard et al. | ............ 477/143 |
| 6,430,483 B1 | | 8/2002 | Takaoka et al. | |
| 6,523,504 B1 | * | 2/2003 | Miura | ............... 123/21 |
| 6,620,077 B1 | * | 9/2003 | Carlson et al. | ............. 477/107 |
| 2002/0082137 A1 | * | 6/2002 | Steeby | ............... 477/109 |
| 2002/0086771 A1 | * | 7/2002 | Abe | ............... 477/101 |

FOREIGN PATENT DOCUMENTS

| | | |
|---|---|---|
| DE | 10122713 | 2/2002 |
| JP | 9-2106 | 1/1997 |
| JP | 11-36909 | 2/1999 |
| JP | 11-117778 | 4/1999 |

(Continued)

*Primary Examiner*—Roger Pang
(74) *Attorney, Agent, or Firm*—Oblon, Spivak, McClelland, Maier & Neustadt, P.C.

(57) ABSTRACT

A control apparatus for an automotive vehicle having an automatic transmission and an engine capable of controlling a resistance to its rotary motion. The control apparatus is adapted to change an output torque of the engine temporarily during a shifting action of the automatic transmission. The control apparatus includes inertia-phase torque changing means for changing an inertia torque of the engine during the shifting action, by controlling the resistance of the rotary motion of the engine. This inertia-phase torque changing means may be adapted to change the inertia torque during a switching of an operating state of a lock-up clutch which is provided in a fluid-operated power transmitting device interposed between the automatic transmission and the engine.

17 Claims, 23 Drawing Sheets

FOREIGN PATENT DOCUMENTS

| | | |
|---|---|---|
| JP | 11-141364 | 5/1999 |
| JP | 2000-8931 | 1/2000 |
| JP | 3086279 | 7/2000 |
| JP | 3109380 | 9/2000 |
| JP | 2001-182820 | 7/2001 |

* cited by examiner

FIG. 2

| | C0 | C1 | C2 | B0 | B1 | B2 | B3 | B4 | F0 | F1 | F2 |
|---|---|---|---|---|---|---|---|---|---|---|---|
| P | ○ | | | | | | | | ○ | | |
| R | ○ | | ○ | ○ | | | | ○ | | | |
| N | ○ | | | | | | | | ○ | | |
| 1st | ○ | ○ | | | | | | ◎ | ○ | | ○ |
| 2nd | ◎ | ○ | | | | | | | ○ | | |
| 3rd | ○ | ○ | | | ◎ | ○ | | | ○ | ○ | |
| 4th | ○ | ○ | ○ | | | △ | ○ | | ○ | | |
| 5th | | ○ | ○ | ○ | | △ | | | ○ | | |

○ ENGAGED
◎ ENGAGED FOR ENGINE BRAKE APPLICATION
△ ENGAGED (NOT CONTRIBUTING TO TRANSMISSION OF POWER)

|  | | 1-2 SHIFT SLT | 2-3 SHIFT SLT |
|---|---|---|---|
| THROTTLE OPENING ANGLE $\theta_{TH}$ | $\theta_1$ | a1 | b1 |
| | $\theta_2$ | a2 | b2 |
| | ⋮ | ⋮ | ⋮ |
| | $\theta_8$ | a8 | b8 |

SELF-ABSORPTION AMOUNT OF ROTATIONAL ENERGY
(SELF-REDUCTION AMOUNT $\Delta N_E$ OF ROTATIONAL SPEED $N_E$)

FIG. 20

| DRIVE POWER SOURCE | SHIFT LEVER | DRIVE POSITION | C1 | C2 | B1 | GEAR RATIO |
|---|---|---|---|---|---|---|
| ENGINE | D | 2nd | ○ | ○ | × | 1 |
| | Rev | 2nd (LOW SPEED) | △ | ○ | × | 1 |
| | N | HIGH SPEED | ○ | × | ○ | $-1/\rho 2$ |
| | | LOW SPEED | △ | × | ○ | $-1/\rho 2$ |
| MG | D | 1st | × | × | ○ | $1/\rho 1$ |
| | | 2nd (ASSIST) | ○ | ○ | ○ | 1 |
| | | 2nd (REGENERATE) | × | ○ | × | 1 |
| | Rev | LOW SPEED | × | × | ○ | $-1/\rho 1$ |

○ ENGAGED △ SLIPPING × RELEASED

ENGINE ROTATIONAL SPEED SELF-CHANGE AMOUNT

ENGINE TORQUE REDUCTION AMOUNT

VEHICLE CONTROL APPARATUS HAVING MEANS FOR CHANGING INERTIA TORQUE OF ENGINE DURING SHIFTING ACTION OR DURING SWITCHING OF OPERATING STATE OF LOCK-UP CLUTCH

BACKGROUND OF THE INVENTION

1. Field of the Invention

The present invention relates in general to a vehicle control apparatus adapted to control an engine during a shifting action of an automatic transmission which is arranged to receive an output of the engine, or during a switching of an operating state of a lock-up clutch provided in a fluid-operated transmitting device interposed between the engine and the automatic transmission. More particularly, the present invention is concerned with techniques for controlling a torque transmitted to the automatic transmission during the shifting action of the automatic transmission or during the switching of the operating state of the lock-up clutch.

2. Discussion of the Related Art

There is known a vehicle control apparatus for an automotive vehicle having an automatic transmission and an engine capable of controlling or changing its rotational speed thereof by itself. The control apparatus is adapted to temporarily reduce an output torque of the engine during a shifting action of the automatic transmission which receives the output torque from the engine, for the purpose of reducing a shifting shock of the automatic transmission. That is, during a shift-up action of the automatic transmission, the output torque of the engine is reduced temporarily in an inertia phase. During a shift-down action of the automatic transmission, the output torque of the engine is reduced temporarily upon completion of the shift-down action of the automatic transmission. An example of such a control apparatus is disclosed in JP-A-2001-182820 (publication of unexamined Japanese Patent Application laid open in 2001). Another example of the control apparatus is disclosed in JP-A-H11-36909 (publication of unexamined Japanese Patent Application laid open in 1999), wherein the output torque of the engine is temporarily reduced in the process of the shift-up action by retarding an ignition timing of the engine as shown in FIG. 14 of the publication.

However, in the conventional control apparatuses, the shifting shock of the transmission is not necessarily reduced to a sufficiently small degree, due to restrictions or limitations in an amount of the reduction of the engine output torque and also in the timing at which the output torque is to be reduced. For example, where the output torque is intended to be temporarily reduced by retarding of an ignition timing of the engine, the ignition timing can not be retarded by such a large extent that would overload a catalytic converter of the vehicle. Thus, such a restriction or limitation makes it impossible to sufficiently reduce the engine output torque and the shifting shock.

SUMMARY OF THE INVENTION

The present invention was made in the light of the background art discussed above. It is therefore an object of the present invention to provide a vehicle control apparatus which is capable of sufficiently reduce a torque transmitted from the engine to the automatic transmission, i.e., an input torque of the automatic transmission, during a shifting action of the transmission or during a switching of an operating state of the lock-up clutch, for thereby making it possible to sufficiently reduce a shifting shock of the transmission or switching shock of the lock-up clutch. This object of the invention may be achieved according to any one of first through twenty-second aspects of the invention which are described below.

The first aspect of this invention provides a control apparatus for an automotive vehicle having an automatic transmission and an engine capable of controlling a resistance to a rotary motion thereof, the control apparatus changing an output torque of the engine temporarily during a shifting action of the automatic transmission, the control apparatus comprising: inertia-phase torque changing means for changing an inertia torque of the engine generated in an inertia phase of the shifting action, by controlling the resistance to the rotary motion of the engine.

In the control apparatus of the first aspect of the invention, the inertia-phase torque changing means controls the resistance to the rotary motion of the engine during the shifting action of the automatic transmission, for changing the inertia torque generated in the inertia phase of the shifting action. This arrangement makes it possible to reduce a torque transmitted from the engine to the automatic transmission, to such an extent that sufficiently reduces a shifting shock of the transmission.

According to the second aspect of the invention, the control apparatus defined in the first aspect of the invention is adapted to change the amount by which the output torque of the engine is to be reduced, on the basis of the amount of change of the inertia torque of the engine. In this arrangement, since the reduction amount of the engine torque is changed on the basis of the change amount of the inertia torque of the engine, it is possible to prevent deterioration of efficiency of clean-up of an exhaust gas, and other problems that could be caused as a result of change in a lift, duration and/or opening timing of at least one of intake and exhaust valves, which change is made for the purpose of increasing the resistance to the rotary motion of the engine.

According to the third aspect of the invention, in the control apparatus defined in the first or second aspect of the invention, the engine includes an electromagnetic actuator for electromagnetically actuating at least one of intake and exhaust valves of the engine.

According to the fourth aspect of the invention, in the control apparatus defined in the first or second aspect of the invention, the engine includes a motor actuator for rotatably actuating at least one of intake and exhaust valves of the engine.

In the arrangement of third or fourth aspect of the invention, the lift, duration and/or opening timing of at least one of intake and exhaust valves can be accurately controlled by controlling the electromagnetic actuator or the motor actuator, whereby the inertia torque of the engine is accurately controllable.

According to the fifth aspect of the invention, in the control apparatus defined in any one of the first through fourth aspects of the invention, the automatic transmission includes a planetary gear device.

The sixth aspect of this invention provides a control apparatus for an automotive vehicle having an automatic transmission, an engine capable of controlling a resistance to a rotary motion thereof, and a fluid-operated power transmitting device interposed between the automatic transmission and the engine and including a lock-up clutch, the control apparatus comprising: inertia-phase torque changing means for changing an inertia torque of the engine generated in an inertia phase during switching of an operating state of the lock-up clutch, by controlling the resistance of the rotary motion of the engine.

In the control apparatus of the sixth aspect of the invention, the inertia-phase torque changing means controls the resistance to the rotary motion of the engine during the switching of the operating state of the lock-up clutch, for changing the inertia torque of the engine generated in the inertia phase. This arrangement makes it possible to reduce a torque transmitted from the engine to the automatic transmission, to such an extent that sufficiently reduces a switching shock of the lock-up clutch. It is noted that the term "switching of the operating state of the lock-up clutch" may be interpreted to mean a switching of the operating state of the lock-up clutch from one of the engaged, released and slipping states to another state.

According to the seventh aspect of the invention, the control apparatus defined in the sixth aspect of the invention is adapted to change the amount by which the output torque of the engine is to be reduced, on the basis of the amount of change of the inertia torque of the engine.

According to the eighth aspect of the invention, in the control apparatus defined in the sixth or seventh aspect of the invention, the engine includes an electromagnetic actuator for electromagnetically actuating at least one of intake and exhaust valves of the engine.

According to the ninth aspect of the invention, in the control apparatus defined in the sixth or seventh aspect of the invention, the engine includes a motor actuator for rotatably actuating at least one of intake and exhaust valves of the engine.

According to the tenth aspect of the invention, in the control apparatus defined in any one of the sixth through ninth aspects of the invention, the automatic transmission includes a planetary gear device.

The eleventh aspect of this invention provides a control apparatus for an automotive vehicle having an automatic transmission and an engine capable of changing its rotational speed (number of revolutions per unit time) by itself, the control apparatus changing an output torque of the engine temporarily during a shifting action of the automatic transmission, the control apparatus comprising: (a) required torque-change amount determining means for determining a required amount by which the output torque is to be changed temporarily during the shifting action; (b) engine-speed self-changing means for causing the engine to change the rotational speed by itself during the shifting action; and (c) required torque-change-amount modifying means for modifying the required amount, on the basis of change of the rotational speed of the engine caused by the engine-speed self-changing means.

In the control apparatus of the eleventh aspect of the invention, when the rotational speed is changed by the engine itself during a shifting action of the automatic transmission, the required torque change amount determined by the torque-change-amount determining means is modified by the required torque-change-amount modifying means, on the basis of the change of the engine rotational speed made by the engine itself. In this arrangement, the required torque change amount is changed by an amount corresponding to the amount of the self-change of the engine rotational speed, which can be done relatively rapidly. That is, owing to this arrangement, the engine output torque can be changed to such an extent that sufficiently reduces a shifting shock of the transmission, without suffering from a limitation in an amount of retarding of an ignition timing of the engine, namely, without suffering from a limitation in an amount of the change of the engine output torque and a limitation in the timing at which the output torque is to be changed. It is noted that the term "engine capable of changing its rotational speed by itself" may be interpreted to mean an engine equipped with a rotational-speed self-changing device operable to change the rotational speed.

According to the twelfth aspect of the invention, in the control apparatus defined in the eleventh aspect of the invention, the required torque-change-amount modifying means modifies the required amount, on the basis of an amount of the change of the rotational speed of the engine caused by the engine-speed self-changing means.

According to the thirteenth aspect of the invention, in the control apparatus defined in the eleventh or twelfth aspect of the invention, the required torque-change-amount determining means determines a required reduction amount by which the output torque is to be reduced temporarily during a shift-up action of the automatic transmission, wherein the engine-speed self-changing means causes the engine to reduce the rotational speed by itself during the shift-up action, and wherein the required torque-change-amount modifying means modifies the required reduction amount, on the basis of an amount of reduction of the rotational speed of the engine caused by the engine-speed self-changing means.

In the control apparatus of the thirteenth aspect of the invention, the required torque reduction amount is reduced by an amount corresponding to the amount of the self-reduction of the engine rotational speed, which can be done relatively rapidly. Owing to this arrangement, the engine output torque can be reduced to such an extent that sufficiently reduces a shifting shock of the transmission, without suffering from a limitation in an amount of retarding of an ignition timing of the engine, namely, without suffering from a limitation in an amount of the change of the engine output torque and a limitation in the timing at which the output torque is to be changed.

According to the fourteenth aspect of the invention, in the control apparatus defined in the thirteenth aspect of the invention, the engine includes a rotational-speed self-changing device operable to change the rotational speed, the rotational-speed self-changing device including an electromagnetic actuator for electromagnetically actuating at least one of intake and exhaust valves of the engine, and a valve drive control device for controlling the electromagnetic actuator so as to control opening and closing of the above-described at least one of intake and exhaust valves such that the rotational speed is reduced during the shift-up action.

According to the fifteenth aspect of the invention, in the control apparatus defined in the fourteenth aspect of the invention, the valve drive control device controls a lift of the above-described at least one of intake and exhaust valves, a duration over which the above-described at least one of intake and exhaust valves is open, and/or an opening timing of the above-described at least one of intake and exhaust valves. In the control apparatus of the fourteenth or fifteenth aspect of the invention, the rotational speed of the engine can be controlled within a relatively wide range with a relatively high response. It is noted that the term "lift" may be interpreted to mean a maximum distance between the valve and its seat during each engine cycle. The "duration" may be interpreted to mean an amount of time or angle of rotation of a crankshaft over which the valve is open during each engine cycle. The "opening timing" may be interpreted to mean an angular position of the crankshaft at which the valve begins to open.

According to the sixteenth aspect of the invention, in the control apparatus defined in any one of the thirteenth through fifteenth aspects of the invention, the required torque-change-amount modifying means reduces the required reduction amount by a larger amount when the amount of the reduction of the rotational speed of the engine is relatively large, than when the amount of the reduction of the rotational speed of the engine is relatively small.

According to the seventeenth aspect of the invention, in the control apparatus defined in any one of the eleventh through sixteenth aspects of the invention, the automatic transmission includes a planetary gear device.

The eighteenth aspect of this invention provides a control apparatus for an automotive vehicle having an automatic transmission and an engine capable of changing a rotational speed thereof by itself, the control apparatus changing an output torque of the engine temporarily during a shifting action of the automatic transmission, the control apparatus comprising: (a) required torque-change-amount determining means for determining a required amount by which the output torque is to be changed temporarily during the shifting action; (b) engine-speed self-changing means for causing the engine to change the rotational speed by itself during the shifting action; and (c) engine-speed-change-amount modifying means for modifying a rotational-speed-change amount by which the rotational speed is to be changed, on the basis of change of the output torque of the engine.

In the control apparatus of the eighteenth aspect of the invention, the rotational-speed change amount, by which the rotational speed is to be changed by the engine itself, is modified by the engine-speed-change-amount modifying means, on the basis of the change of the engine output torque. This arrangement makes it possible to change the engine output torque to such an extent that sufficiently reduces a shifting shock of the transmission, even where there is a limitation in an amount of retarding of an ignition timing of the engine, namely, even where there are limitations in an amount of the change of the engine output torque and in the timing at which the output torque is to be changed.

According to the nineteenth aspect of the invention, in the control apparatus defined in the eighteenth aspect of the invention, the engine-speed-change-amount modifying means modifies the rotational-speed change amount by which the rotational speed is to be changed, on the basis of an amount of the change of the output torque of the engine.

According to the twentieth aspect of the invention, in the control apparatus defined in the eighteenth or nineteenth aspect of the invention, the required torque-change-amount determining means determines a required reduction amount by which the output torque is to be reduced temporarily during a shift-up action of the automatic transmission, wherein the engine-speed self-changing means causes the engine to reduce the rotational speed by itself during the shift-up action, and wherein the engine-speed-change-amount modifying means modifies a rotational-speed reduction amount by which the rotational speed is to be reduced, on the basis of reduction of the output torque of the engine.

In the control apparatus of this twentieth aspect of the invention, the rotational-speed reduction amount, by which the rotational speed is to be reduced by the engine itself, is modified by the engine-speed-change-amount modifying means, on the basis of the reduction of the engine output torque. That is, the engine-speed-change-amount modifying means modifies the rotational-speed reduction amount such that the rotational-speed reduction amount is made larger when the reduction of the engine output torque is relatively small, than when the reduction of the engine output torque is relatively large. In other words, the required reduction amount of the engine output torque can be reduced by an amount corresponding to the amount of the self-reduction of the engine rotational speed, which can be done relatively rapidly. This arrangement makes it possible to reduce the engine output torque to such an extent that sufficiently reduces a shifting shock of the transmission, even where there is a limitation in an amount of retarding of an ignition timing of the engine, namely, even where there are limitations in an amount of the change of the engine output torque and in the timing at which the output torque is to be changed.

According to the twenty-first aspect of the invention, in the control apparatus defined in the twentieth aspect of the invention, the speed-change-amount modifying means modifies the rotational-speed reduction amount such that the rotational-speed reduction amount is made larger when the reduction of the output torque is restricted or inhibited, than when the reduction of the output torque is neither restricted nor inhibited.

In the control apparatus of this twenty-first aspect of the invention, the required reduction amount of the engine output torque can be reduced by an amount corresponding to the amount of the self-reduction of the engine rotational speed, which can be done relatively rapidly. This arrangement makes it possible to reduce the engine output torque to such an extent that sufficiently reduces a shifting shock of the transmission, even where there is a limitation in an amount of retarding of an ignition timing of the engine, namely, even where there are limitations in an amount of the change of the engine output torque and in the timing at which the output torque is to be changed.

According to the twenty-second aspect of the invention, in the control apparatus defined in the twenty-first aspect of the invention, the reduction of the output torque is restricted or inhibited when a temperature of a coolant water of the engine is smaller than a predetermined threshold.

According to the twenty-third aspect of the invention, in the control apparatus defined in the twenty-first or twenty-second aspect of the invention, the reduction of the output torque is restricted or inhibited when retarding of an ignition timing of the engine is restricted or inhibited, or when successive retarding of the ignition timing is restricted or inhibited.

In the control apparatus of the twenty-second or twenty-third aspect of the invention, the speed-change-amount modifying means modifies the rotational-speed reduction amount, such that the rotational-speed reduction amount is made larger when the temperature of the coolant water is smaller than the predetermined threshold than when the temperature of the coolant water is not smaller than the predetermined threshold, or such that the rotational-speed reduction amount is made larger when retarding of the ignition timing is inhibited than when retarding of the ignition timing is not inhibited. That is, the required reduction amount of the engine output torque can be reduced by an amount corresponding to the amount of the self-reduction of the engine rotational speed, which can be done relatively rapidly. This arrangement makes it possible to reduce the engine output torque to such an extent that that sufficiently reduces a shifting shock of the transmission, even where there is a limitation in an amount of retarding of an ignition timing of the engine, namely, even where there are limitations in an amount of the change of the engine output torque and in the timing at which the output torque is to be changed.

According to the twenty-fourth aspect of the invention, in the control apparatus defined in any one of the twentieth through twenty-third aspects of the invention, the engine includes a rotational-speed self-changing device operable to change the rotational speed, the rotational-speed self-changing device including an electromagnetic actuator for electromagnetically actuating at least one of intake and exhaust valves of the engine, and a valve drive control device for controlling the electromagnetic actuator so as to control opening and closing of the above-described at least one of intake and exhaust valves such that the rotational speed is reduced during the shift-up action.

According to the twenty-fifth aspect of the invention, in the control apparatus defined in the twenty-fourth aspect of the invention, the valve drive control device controls a lift of the above-described at least one of intake and exhaust valves, a duration over which the above-described at least one of intake and exhaust valves is open, and/or an opening timing of the above-described at least one of intake and exhaust valves. In the control apparatus of the twenty-fourth or twenty-fifth aspect of the invention, the rotational speed of the engine can be controlled within a relatively wide range with a relatively high response.

According to the twenty-sixth aspect of the invention, in the control apparatus defined in any one of the eighteenth through twenty-fifth aspects of the invention, the automatic transmission includes a planetary gear device.

BRIEF DESCRIPTION OF THE DRAWINGS

The above and other objects, features, advantages and technical and industrial significance of this invention will be better understood by reading the following detailed description of the presently preferred embodiments of the invention, when considered in connection with the accompanying drawings, in which:

FIG. 2 is a table indicating a relationship between combinations of operating states of the frictional coupling devices of the automatic transmission and operating positions of the automatic transmission which are established by the respective combinations;

FIG. 20 is a table indicating a relationship between combinations of operating states of frictional coupling devices of the auxiliary transmission portion and operating positions of the automatic transmission which are established by the respective combinations;

DETAILED DESCRIPTION OF THE PREFERRED EMBODIMENT

Figure 1:
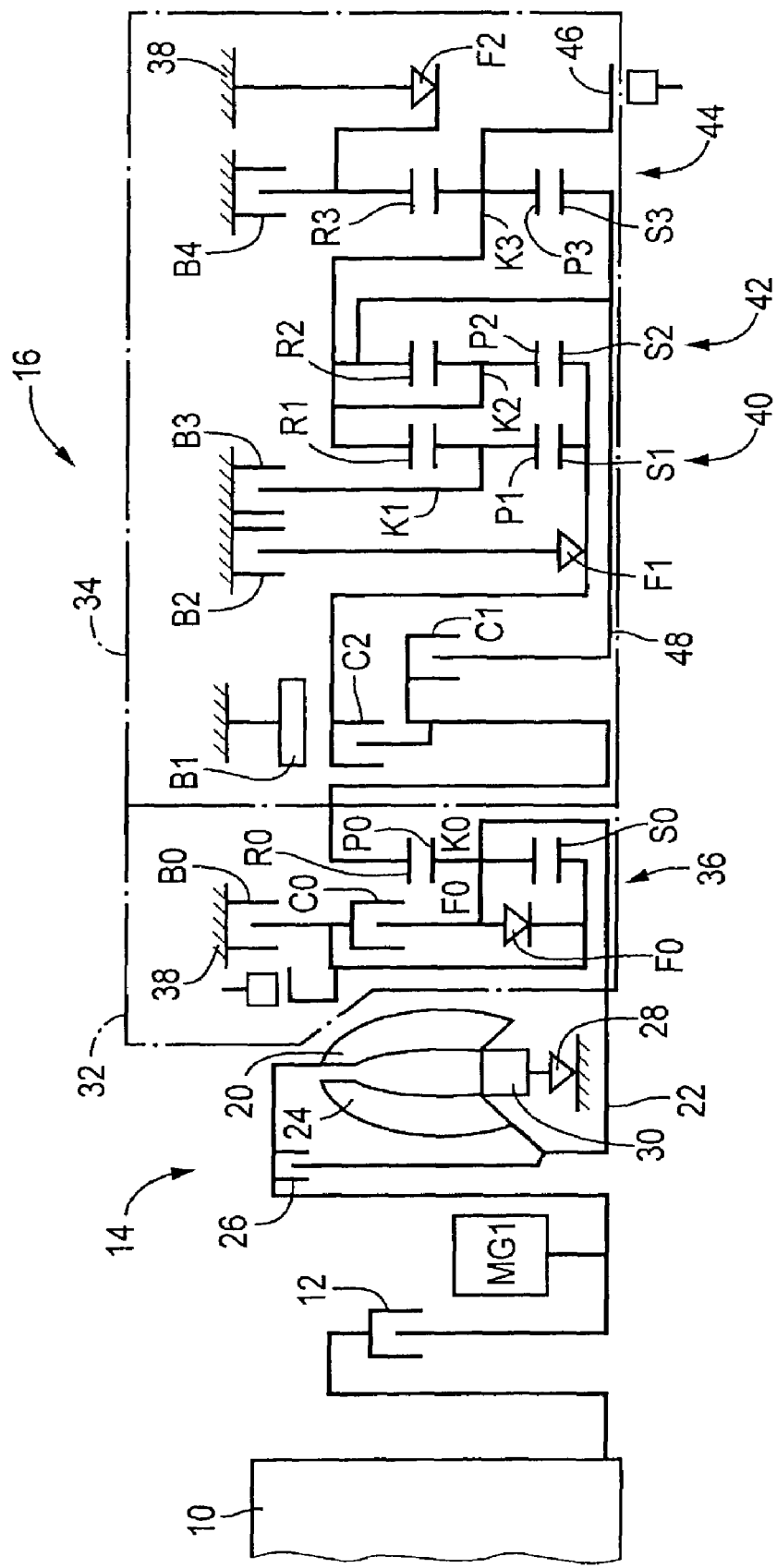
FIG. 1 is a schematic view showing a part of a drive system of an automotive vehicle, which includes an engine and an automatic transmission having hydraulically-operated frictional coupling devices, and which is controlled by a control apparatus constructed according to this invention.

Referring first to the schematic view of FIG. 1, there is shown an arrangement of a drive system of an automotive vehicle having an engine control apparatus constructed according to one embodiment of this invention. The drive system includes a drive power source in the form of an engine 10, a clutch 12, a torque converter 14 and an automatic transmission 16. An output of the engine 10 is transmitted to the automatic transmission 16 through the clutch 12 and torque converter 14, and is transmitted from the automatic transmission 16 to drive wheels through a differential gear device and drive axles, which are well known in the art and are not shown. Between the clutch 12 and the torque converter 14, there is disposed a first motor/generator MG1 which functions as an electric motor and an electric generator. The torque converter 14 includes: a pump impeller 20 connected to the clutch 12; a turbine impeller 24 connected to an input shaft 22 of the automatic transmission 16; a lock-up clutch 26 for directly connecting the pump and turbine impellers 20, 24; a one-way clutch 28; and a stator impeller 30 which is inhibited by the one-way clutch 28 from rotating in one of opposite directions.

The automatic transmission 16 includes a first transmission unit 32 having two speed positions, that is, a high-speed position and a low-speed position, and a second transmission unit 34 having five operating positions, that is, one reverse drive position and four forward drive positions. The first transmission unit 32 includes a high-low switching planetary gear device 36 having a sun gear S0, a ring gear R0, a carrier K0, and planetary gears P0 which are rotatably supported by the carrier K0 and which mesh with the sun gear S0 and ring gear R0. The first transmission unit 32 further includes a clutch C0 and a one-way clutch F0 disposed between the sun gear S0 and the carrier K0, and a brake B0 disposed between the sun gear S0 and a housing 38.

The second transmission unit 34 includes a first planetary gear set 40, a second planetary gear set 42, and a third planetary gear set 44. The first planetary gear set 40 includes a sun gear S1, a ring gear R1, a carrier K1, and planetary gears P1 which are rotatably supported by the carrier K1 and which mesh with the sun gear S1 and ring gear R1. The second planetary gear set 42 includes a sun gear S2, a ring gear R2, a carrier K2, and planetary gears P2 which are rotatably supported by the carrier K2 and which mesh with the sun gear S2 and ring gear R2. The third planetary gear set 44 includes a sung gear S3, a ring gear R3, a carrier K3, and planetary gears P3 which are rotatably supported by the carrier K3 and which mesh with the sun gear S3 and ring gear R3.

The sun gears S1 and S2 are integrally connected to each other, while the ring gear R1 and carriers K2 and K3 are integrally connected to each other. The carrier K3 is connected to an output shaft 46 of the automatic transmission 16. A clutch C1 is disposed between the ring gear R0 and an intermediate shaft 48 connected to the sun gear S3, while a clutch C2 is disposed between the sun gears S1, S2 and the ring gear R0. A brake B1 of band type for inhibiting rotation of the sun gears S1 and S2 is fixed to the housing 38. An one-way clutch F1 and a brake B2 are disposed in series with each other between the sun gears S1, S2 and the housing 38. This one-way clutch F1 is engaged when the sun gears S1 and S2 receive a torque so as to be rotated in a direction opposite to the direction of rotation of the input shaft 22.

A brake B3 is disposed between the carrier K1 and the housing 38, while a brake B4 and an one-way clutch F2 are disposed in parallel with each other between the ring gear R3 and the housing 38. This one-way clutch F2 is engaged when the ring gear R3 receives a torque so as to be rotated in the direction opposite to the direction of rotation of the input shaft 22.

The automatic transmission 16 constructed as described above has one reverse drive position and five forward drive positions, which are selectively established by engagement of respective combinations of frictional coupling devices in the form of the clutches C0–C2, brakes B0–B4 and one-way clutches F0–F2, as indicated in the table of FIG. 2 by way of example. In FIG. 2, "○" indicates the engaged state of each frictional coupling device, and the absence of any symbol indicates the released state of each frictional coupling device. "⊚" indicates the engagement of the appropriate frictional coupling device for applying an engine brake to the vehicle, and "Δ" indicates the engagement of the appropriate frictional coupling device, which does not contribute to transmission of power. It will be understood from the table of FIG. 2 that a 2–3 shift-up action of the automatic transmission 16 from a 2nd-speed position to a 3rd-speed position is a so-called "clutch-to-clutch" shifting action which is effected by an engaging action of the brake B2 and a releasing action of the brake B3 which take place concurrently with each other. In the process of this 2–3 shift-up action of the automatic transmission 16, there exists a slipping period during which a drive torque is transmitted through both the brake B3 in the process of its releasing action and the brakes B2 in its engaging action. Each of the other shifting actions is effected only by an engaging or releasing action of one of the clutches, or by an engaging or releasing action of one of the brakes. The above-indicated clutches C0–C2 and brakes B0–B4 are hydraulically-operated frictional coupling devices each of which is actuated by a hydraulic actuator.

The engine 10 is provided with a turbocharger (turbosupercharger) 54, and is operated with a fuel injected into its cylinders. This engine 10 is a so-called "lean-burn" engine which is operated with an air-fuel mixture whose air/fuel ratio A/F is higher than the stoichiometric value, while the engine 10 is in a low-load condition. The operation with such a higher air/fuel ratio A/F serves to reduce the fuel consumption. The engine 10 has two banks of cylinders 10A and 10B disposed on the right and left sides. Each bank consists of three cylinders. The engine 10 is arranged such that the cylinders of one of the two banks 10A, 10B or the cylinders of both of the two banks 10A, 10B are operated simultaneously. Thus, the number of the cylinders to be operated can be changed.

Figure 3:
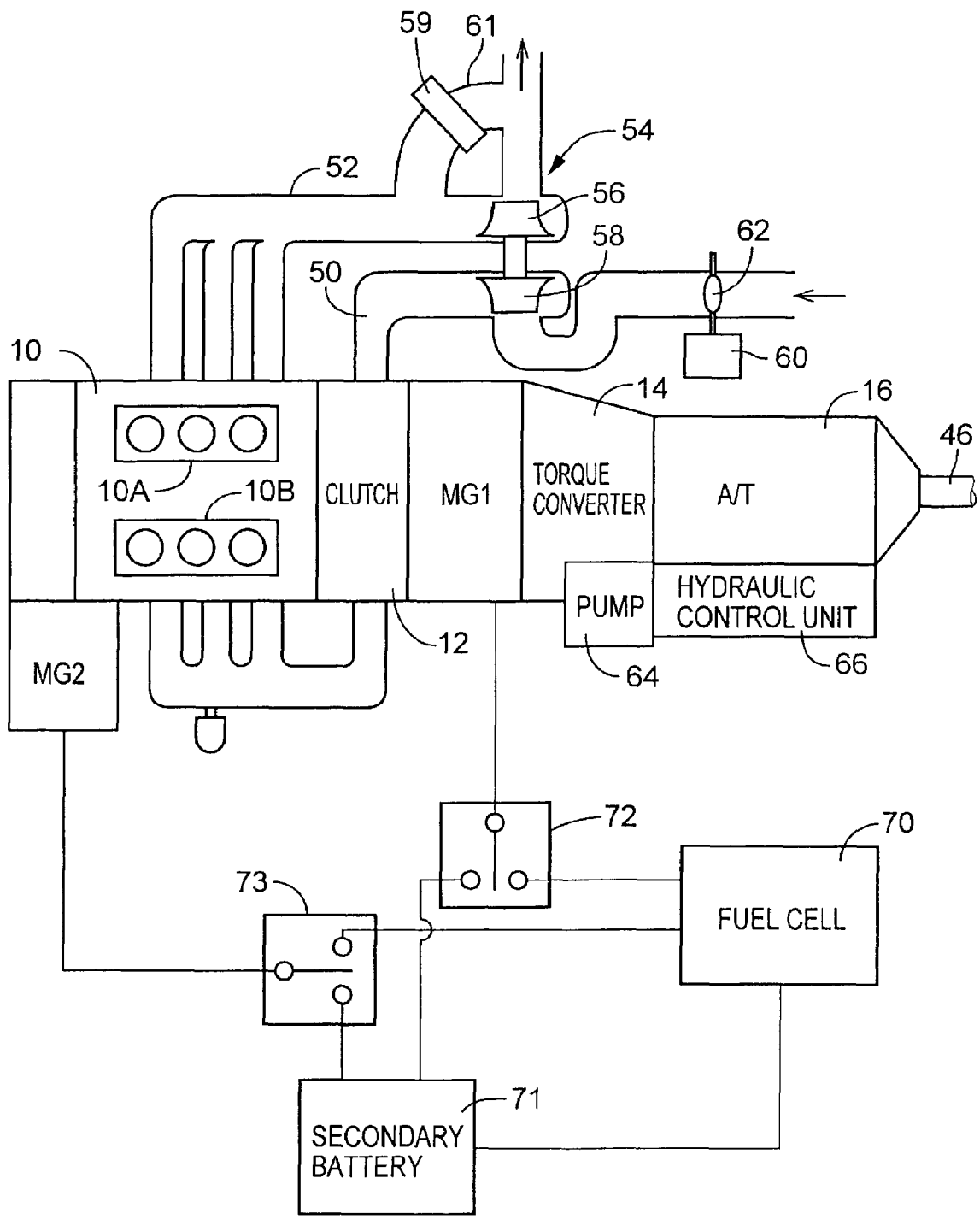
FIG. 3 is a view showing various devices of the vehicle drive system of FIG. 1 including the engine and automatic transmission.

As indicated in FIG. 3, the engine 10 has an intake pipe 50, an exhaust pipe 52, and the turbocharger 54 which is disposed so as to bridge the intake and exhaust pipes 50, 52. The turbocharger 54 includes a turbine impeller 56 which is rotated by a stream of exhaust emission from the engine 10 through the exhaust pipe 52, and a pump impeller 58 which is disposed in the intake pipe 50 so as to compress an intake air and which is connected to the turbine impeller 56 so that the pump impeller 58 is rotated by the turbine impeller 56. A by-pass passage 61 which by-passes the turbine impeller 56 is connected to the exhaust pipe 52 such that the by-pass-passage 61 is disposed in parallel with a portion of the exhaust pipe 52 in which the turbine impeller 56 is provided. The by-pass passage 61 is provided with an exhaust waste gate valve 59 which is controlled to change a ratio of a volume of the exhaust emission flowing to drive the turbine impeller 56, to a volume of the exhaust emission flowing through the by-pass passage 61, for thereby adjusting a turbocharging pressure Pa within the intake pipe 50. The turbocharger 54 of exhaust turbine type may be replaced by a turbocharger of mechanical type driven by the engine 10 or an electric motor.

A throttle valve 62 is disposed within the intake pipe 50 of the engine 10. The throttle valve 62 is actuated by a throttle actuator 60 such that an opening angle $\theta_{TH}$ of the throttle valve 62 is in principle controlled to a value corresponding to an operating amount $\theta_{ACC}$ of an accelerator pedal (not shown). However, the opening angle $\theta_{TH}$ determined by the operating amount $\theta_{ACC}$ is automatically adjusted by an electronic control unit 90 (which will be described), depending upon various running conditions of the vehicle, so as to adjust the output of the engine 10. For instance, the angle of operating $\theta_{TH}$ is adjusted depending upon whether the automatic transmission 16 is in a shifting action or not.

As also shown in FIG. 3, the first motor/generator MG1 is disposed between the engine 10 and the automatic transmission 16, such that the clutch 12 is disposed between the engine 10 and the first motor/generator MG1. The vehicle drive system further includes a hydraulic control circuit or unit 66 which receives a pressurized fluid from an electrically-operated hydraulic pump 64 and which controls the hydraulically-operated frictional coupling devices of the automatic transmission 16 and the lock-up clutch 26. A second motor/generator MG2 is operatively connected to the engine 10, as indicated in FIG. 3. The vehicle drive system further includes a fuel cell 70 and a secondary battery 71 which serve as an electric power source for the first motor/generator MG1 and the second motor/generator MG2, and also includes two switching devices 72, 73 which are arranged to control amounts of electric current to be applied from the fuel cell 70 and the secondary battery 71 to the motor/generator MG1 and motor/generator MG2 when serving as the electric motors, and amounts of electric current with which the secondary battery 71 is charged by the motor/generator MG1 and motor/generator MG2 when serving as the electric generators. Each of the switching devices 72, 73 is a device capable of performing a switching function, for instance, a semiconductor switching element capable of serving as an inverter.

Figure 4:
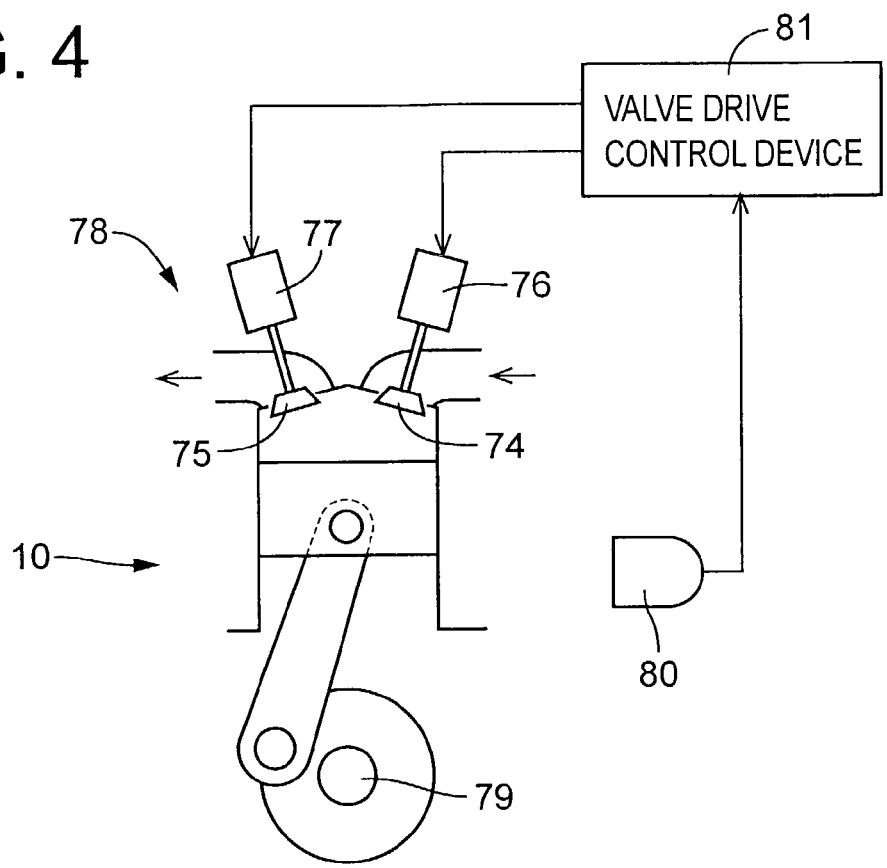
FIG. 4 is a view illustrating a variable valve mechanism provided for each cylinder of the engine.

As shown in FIG. 4, the engine 10 is provided with a rotational-speed self-changing device which is constituted by a variable valve mechanism 78 and a valve drive control device 81. The variable valve mechanism 78 includes an electromagnetic actuator 76 for opening and closing an intake valve 74 of each cylinder, and an electromagnetic actuator 77 for opening and closing an exhaust valve 75 of each cylinder. The valve drive control device 81 is arranged to control the opening and closing timings of the intake and exhaust valves 74, 75, according to an output signal of an angular position sensor 80 for detecting an angular position of a crankshaft 79 of the engine 10. The valve drive control device 81 not only optimizes the opening and closing timings of the intake and exhaust valves 74, 75 depending upon a load acting on the engine 10, but also adjusts the opening and closing timings to be adapted to one of a 4-cycle operating mode and a 2-cycle operating mode which is selected according to a mode selecting signal. The engine 10 has a function of controlling its rotational speed $N_E$ (number of revolutions per minute), with the valve drive control device 81 which permits the adjustment of the operating timings of the intake and exhaust valves 74, 75 of the variable valve mechanism 78. That is, the resistance to a rotary motion of the crankshaft 79 of the engine 10 can be increased or reduced by controlling the operating timings of the intake and exhaust valves 74, 75. Accordingly, the engine speed $N_E$ can be positively or rapidly reduced at a desired rate in the process of a shift-up action of the automatic transmission 16, for example.

Figure 5:
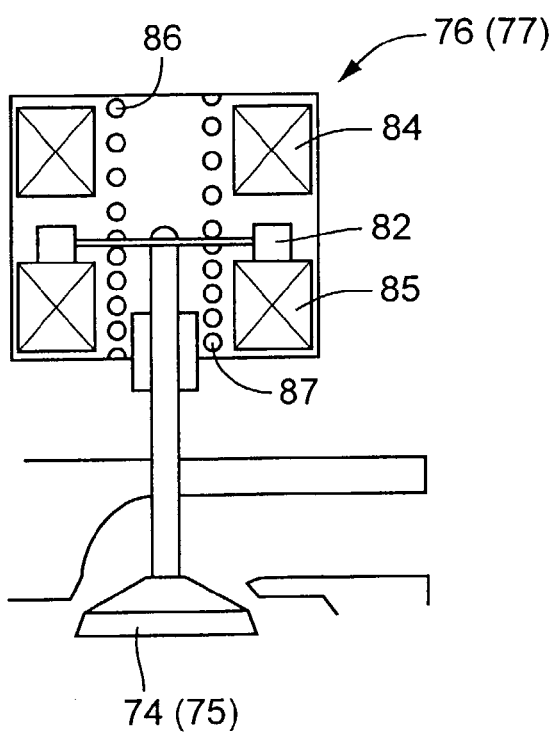
FIG. 5 is a view illustrating an arrangement of an electromagnetic actuator system provided in the variable valve mechanism of FIG. 4, for opening and closing an intake valve or an exhaust valve at a predetermined timing.

Each of the electromagnetic actuators 76, 77 includes a circular disc-like movable member 82 made of a magnetic material, which is connected to the intake or exhaust valve 74, 75 such that the movable member 82 is movable in the axial direction of the valve 74, 75, as shown in FIG. 5. The electromagnetic actuator 76, 77 further includes a pair of electromagnets 84, 85 disposed on the respective opposite sides of the movable member 82, and a pair of coil springs 86, 87 biasing the movable member 82 to its neutral position between the two electromagnets 84, 85. The movable member 82 is attracted by one of the two electromagnets 84, 85.

Figure 6:
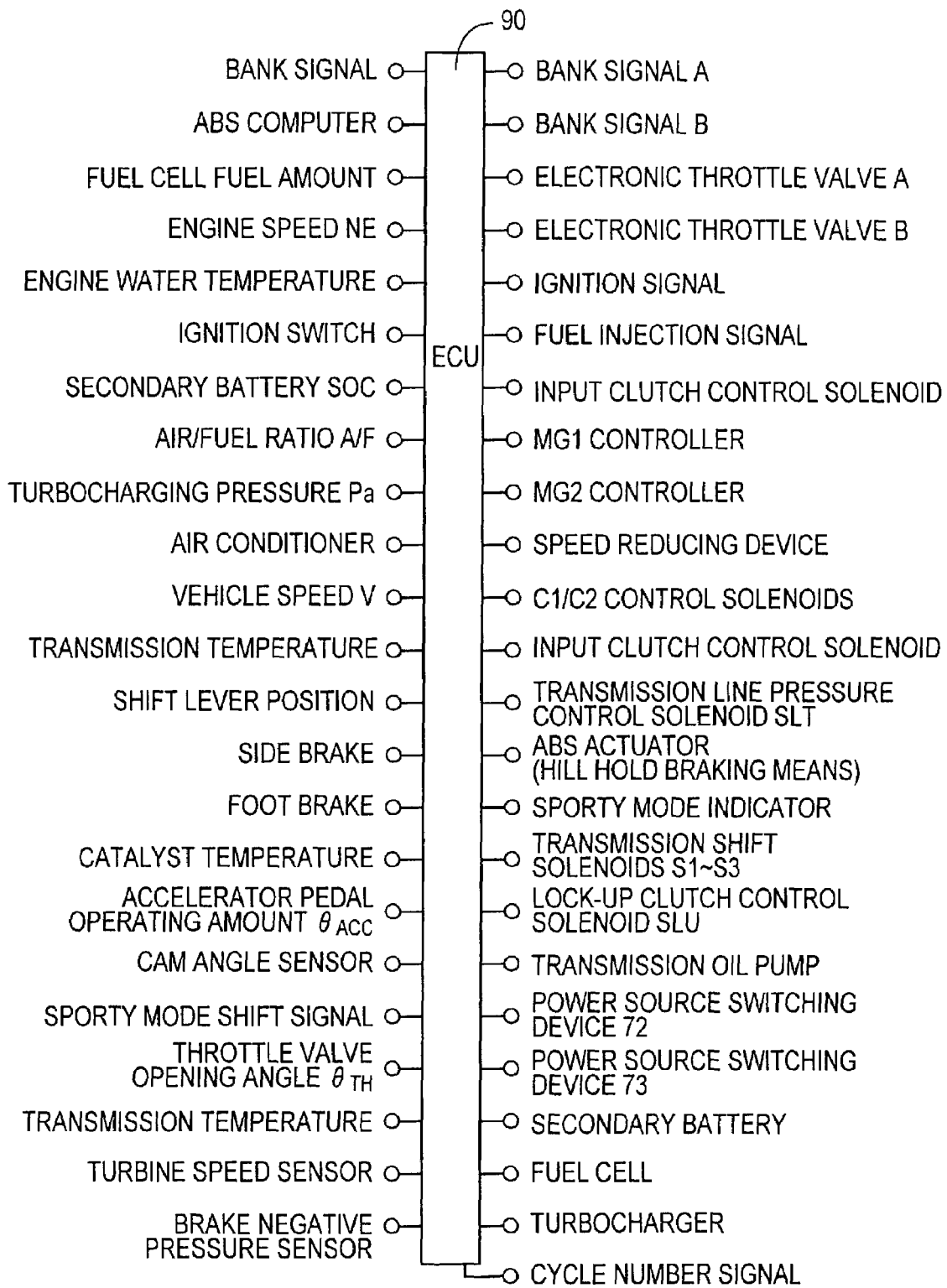
FIG. 6 is a view for explaining input and output signals of the control apparatus in the form of an electronic control unit (ECU) used for the vehicle provided with the drive system of FIG. 1.

The vehicle drive system described above is controlled by the above-indicated electronic control unit (ECU) 90, the input and output signals of which are indicated in FIG. 6. The electronic control unit 90 receives, as its input signals, the following output signals of various sensors (not shown): an accelerator signal indicative of the operating amount or angle $\theta_{ACC}$ of the accelerator pedal; a throttle opening angle signal indicative of the opening angle $\theta_{TH}$ of the throttle valve 62; a vehicle speed signal indicative of a rotational speed $N_{OUT}$ of the output shaft 46 of the automatic transmission 16, which can be used to detect a running speed V of the vehicle; an engine speed signal indicative of the speed $N_E$ of the engine; a signal indicative of the turbocharging pressure Pa in the intake pipe 50; a signal indicative of the air/fuel ratio A/F of the air-fuel mixture; a signal indicative of a presently selected operating position $S_H$ of a shift lever 92; and a signal indicative of a temperature $T_{OIL}$ of working fluid used for the automatic transmission 16. The electronic control unit 90 generates the following output signals: a throttle actuator drive signal for controlling the throttle actuator 60 to operate the throttle valve 62, for establishing the throttle opening angle $\theta_{TH}$ corresponding to the operating amount $\theta_{ACC}$ of the accelerator pedal; a fuel injection signal for controlling an amount of fuel to be injected from a fuel injector valve into each cylinder of the engine 10; solenoid drive signals for controlling solenoid coils of solenoid-operated valves S1–S3 for driving shift control valves incorporated in the hydraulic control unit 66, to shift the automatic transmission 16 as needed; a drive signal $D_{SLU}$ for controlling a linear solenoid valve SLU to control the engaging, releasing and slipping actions of the lock-up clutch 26, to directly control the brake B3, and to control the clutch-to-clutch shift-up actions; a drive signal $D_{SLT}$ for controlling a linear solenoid valve SLT to produce a throttle pressure $P_{TH}$ corresponding to the opening angle $\theta_{TH}$ of the throttle valve 62; and a drive signal $D_{SLN}$ for controlling a linear solenoid SLN to control the back pressure of an accumulator.

Figure 7:
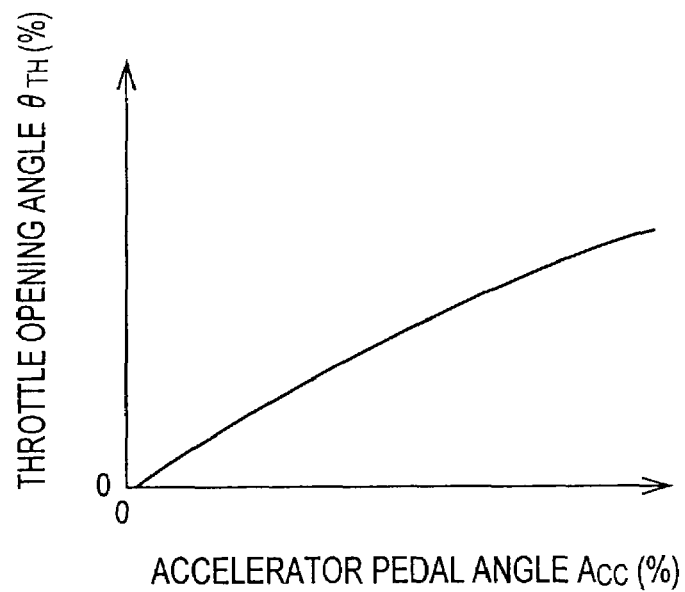
FIG. 7 is a graph indicating a relationship between an operating amount $\theta_{ACC}$ of an accelerator pedal and an opening angle $\theta_{TH}$ of the throttle valve 62 which is actuated by a throttle actuator of the vehicle.

The electronic control unit 90 includes a so-called microcomputer incorporating a central processing unit (CPU), a read-only memory (ROM), a random-access memory (RAM), and an input-output interface. The CPU operates to effect signal processing operations according to control programs stored in the ROM, while utilizing a temporary data storage function of the RAM, for executing various control routines such as: a throttle opening angle control routine for controlling the opening angle $\theta_{TH}$ (%) of the throttle valve 62 on the basis of the operating amount $\theta_{ACC}$ (%) of the accelerator pedal and according to a predetermined relationship as indicated in FIG. 7; a transmission shift control routine for controlling the shifting actions of the automatic transmission 16; a lock-up clutch control routine for controlling the engaging, releasing and slipping actions of the lock-up clutch 26; a turbocharging pressure control routine for controlling the turbocharging pressure Pa; a cylinder-number selecting control routine for changing the number of the operating cylinders; and a mode selecting control routine for selecting one of the 2-cycle and 4-cycle operating modes.

Figure 8:
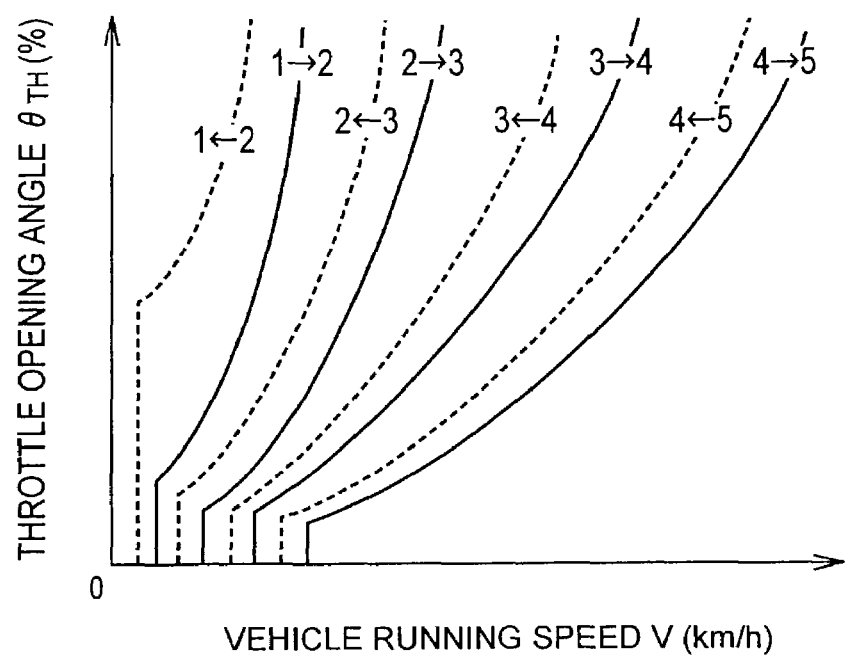
FIG. 8 is a graph showing shift patterns for shifting the automatic transmission, which shift patterns are stored in a ROM of the ECU of FIG. 6.

For instance, the transmission shift control routine is formulated to effect a determination as to whether the automatic transmission 16 should be shifted down or up, on the basis of the detected operating amount or angle $\theta_{ACC}$ (%) of the accelerator pedal or opening angle $\theta_{TH}$ (%) of the throttle valve 62 and the detected vehicle running speed V, and according to predetermined shift-down and shift-up boundary lines as indicated in FIG. 8. Namely, the determination is made as to whether a vehicle running condition defined by the detected values $\theta_{ACC}$ or $\theta_{TH}$ and V has moved across any one of the shift-up and shift-down boundary lines. The detected values $\theta_{ACC}$ or $\theta_{TH}$ represents the output of the engine 10 as desired by the vehicle operator. When any shift-up or shift-down action of the automatic transmission 16 is determined to be required, the hydraulic control unit 66 is controlled to effect the required shift-up or shift-down action. The electronic control unit 90 actuates the solenoid-operated valves S1, S2, S3 so as to establish the selected operating position of the automatic transmission 16 and the selected engaging state of the lock-up clutch 26, and actuates the solenoid-operated valve S4 when an engine brake is to be applied to the vehicle.

In the process of this shifting action, an input torque $T_{IN}$ of the automatic transmission 16 is estimated, and the hydraulic engaging pressure of each hydraulically-operated frictional coupling device which is to be engaged for effecting the shifting action, or the line pressure for this hydraulic engaging pressure is adjusted to a value corresponding to the estimated input torque $T_{IN}$. The lock-up clutch control routine is formulated to select one of the fully engaged, fully released and partially slipping states of the lock-up clutch 26, on the basis of the detected operating amount or angle $\theta_{ACC}$ (%) of the accelerator pedal or opening angle $\theta_{TH}$ (%) of the throttle valve 62 and the detected vehicle running speed V (corresponding to the rotational speed $N_{OUT}$ of the output shaft 46 of the automatic transmission 16), and according to predetermined boundary lines represented by a stored data map. The detected operating angle $\theta_{ACC}$ of the accelerator pedal or opening angle $\theta_{TH}$ (%) of the throttle valve 62 represents a currently required output of the drive system. The lock-up clutch control solenoid valve SLU in the hydraulic control circuit 66 is controlled to place the lock-up clutch 26 in a selected one of its fully engaged, fully released and slip control states. The cylinder-number selecting control routine indicated above is formulated to reduce the number of the operating cylinders, for improving the fuel economy of the engine, when a load acting on the vehicle is relatively low, or stopping the operation of each cylinder whose variable valve mechanism 78 is found defective.

Figure 9:
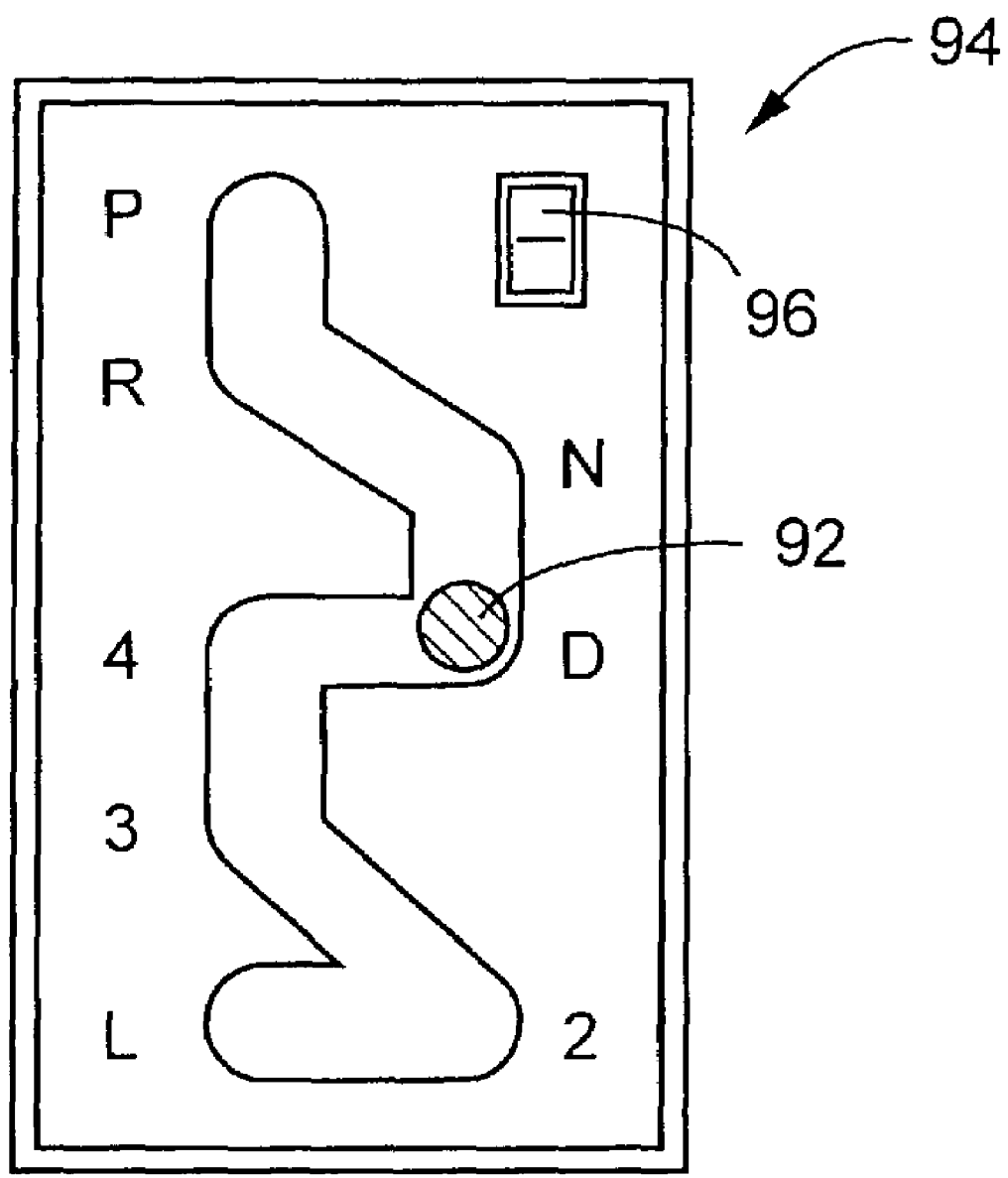
FIG. 9 is a view illustrating a shifting operation device provided in the vehicle.

As shown in FIG. 9, the shift lever 92 is provided in a shifting operation device 94 disposed adjacent to an operator's seat of the motor vehicle. The shift lever 92 is operable for selectively establishing one of operating positions of the automatic transmission 16, which consist of a parking position "P", a neutral position "N", a reverse-driving position "R", a forward-driving position "D" (the highest-speed position), a fourth driving position "4", a third driving position "3", a second driving position "2" and a first driving position "L". In the parking position "P", the output shaft 46 of the automatic transmission 16 is mechanically locked. In the neutral position "N", a power transmitting path of the automatic transmission 16 is disconnected. In the forward-driving position "D", the automatic transmission 16 is automatically shifted to a selected one of 1st-speed, 2nd-speed, 3rd-speed, 4th-speed and 5th-speed positions having respective different gear ratios Y which decrease in the order of description. In the fourth driving position "4", the automatic transmission 16 is automatically shifted to a selected one of the 1st-speed, 2nd-speed, 3rd-speed and 4th-speed positions, while an engine brake is applied to the vehicle with the transmission 16 being placed in one of the four speed positions. In the third driving position "3", the automatic transmission 16 is automatically shifted to a selected one of the 1st-speed, 2nd-speed and 3rd-speed positions, while an engine brake is applied to the vehicle with the transmission 16 being placed in one of the three speed positions. In the second driving position "2", the automatic transmission 16 is automatically shifted to a selected one of the 1st-speed and 2nd-speed positions, while an engine brake is applied to the vehicle with the transmission 16 being placed in one of the two speed positions. In the first driving position "1", the automatic transmission 16 is placed in the 1st-speed position while an engine brake is applied to the vehicle.

The shifting operation device 94 has a switch arranged to detect a presently selected operating position $S_H$ of the shift lever 92, so that the signal indicative of the selected operating position $S_H$ can be inputted to the electronic control unit 90. The shifting operation device 94 further has a mode selecting switch 96 which is operable to place the transmission 16 in a manual shifting mode such as a sporty running mode. When the manual shifting mode is selected with the operation of the mode selecting switch 96, a manual shifting button (not shown) provided on a steering wheel (not shown) of the vehicle is made operable.

Figure 10:
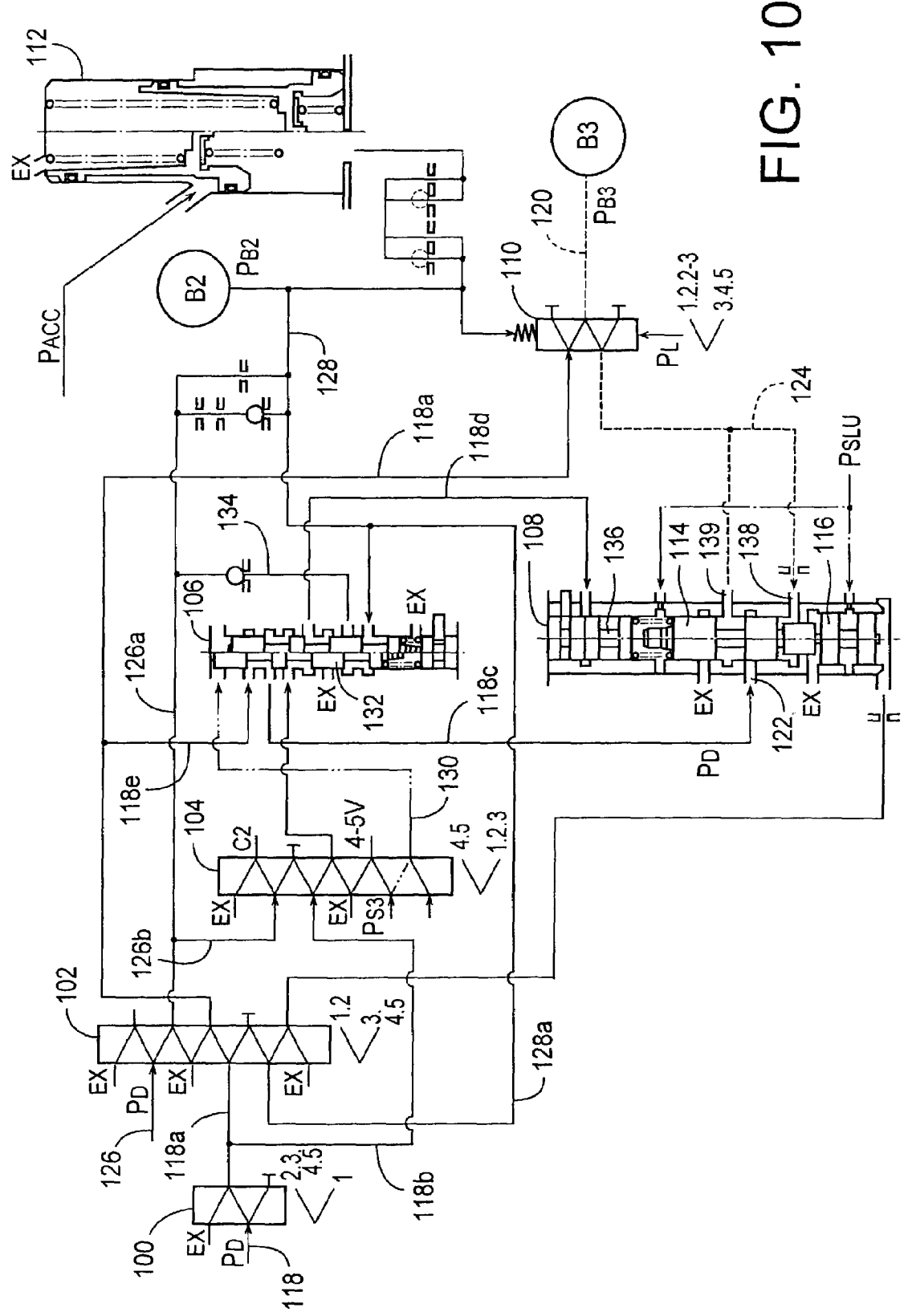
FIG. 10 is a view showing a part of a hydraulic control unit of the automatic transmission in the drive system of FIG. 1.

FIG. 10 shows a portion of the hydraulic control unit 66 which portion is assigned to effect the "clutch-to-clutch" action of the automatic transmission 16 between the 2nd-speed position and the 3rd-speed position. The hydraulic control unit 66 is provided with a 1–2 shift valve 100, a 2–3 shift valve 102, a 3–4 shift valve 104, a B2 release valve 106, a B3 control valve 108, a relay valve 110 and a B2 accumulator 112 which are controlled by the solenoid-operated valves S1–S4 and linear solenoid valve SLU, SLN, SLT.

The B3 control valve 108 includes a spool 114 which is biased by a hydraulic pressure $P_{B3}$ of the brake B3 in the upward direction as seen in FIG. 10 and is biased by a control pressure $P_{SLU}$ (generated by the linear solenoid valve SLU) in the downward direction, so that the hydraulic pressure $P_{B3}$ of the brake B3 is regulated on the basis of a difference between the pressures $P_{B3}$, $P_{SLU}$. The B3 control valve 108 further includes plunger 116, 136 disposed coaxially with the spool 114. In the 2–3 shift-up action of the automatic transmission 16 from the 2nd-speed position to the 3rd-speed position, namely, when an engaging action of the brake B2 and a releasing action of the brake B3 take place concurrently with each other (see FIG. 2), the plunger 116 is biased by a hydraulic pressure $P_{B2}$ of the brake B2 in the upward direction. The plunger 116 is biased by the control pressure $P_{SLU}$ in the downward direction at least in the 2–3 shift-up action. Since the plunger 116 is upwardly biased by the hydraulic pressure $P_{B2}$ of the brake B2, the plunger 116 can be brought into abutting contact with the spool 114, so as to be movable together with the spool 114.

A forward-drive pressure $P_D$ is supplied to the B3 control valve 108 via the 1–2 shift valve 100 which is not switched in the 2–3 shift-up action, so that the hydraulic pressure $P_{B3}$ of the brake B3 is regulated by the forward-drive pressure $P_D$ serving as an original pressure. Between the control valve 108 and the brake B3, the relay valve 110 is provided to be controlled by the hydraulic pressure $P_{B2}$ of the brake B2.

The hydraulic control unit 66 further includes a manual shift valve (not shown) which is mechanically connected to and operated by the shift lever 80. To the manual shift valve, there is connected a forward-drive-pressure fluid passage 118 through which the forward-drive pressure $P_D$ is supplied to the 1–2 shift valve 100. The forward-drive-pressure fluid passage 118 has two branch passages 118a, 118b. The branch passage 118a is connected to the relay valve 110 via the 2–3 shift valve 102, and is connected to an fluid passage 120 of the brake B3 via the relay valve 110. The other branch passage 118b is connected to an input port 122 of the B3 control valve 108 via the 3–4 shift valve 104, the B2 release valve 106 and a fluid passage 118c, and is connected to the relay valve 110 via the B3 control valve 108 and a fluid passage 124.

To the manual shift valve, there is connected another forward-drive-pressure fluid passage 126 through which the forward-drive pressure $P_D$ is supplied to the 2–3 shift valve 102. The forward-drive-pressure fluid passage 126 has two branch passages 126a, 126b. The branch passage 126a is connected to a fluid passage 128 of the brake B2 via an orifice passage. The fluid passage 128 is connected to the branch passage 126a via the B2 release valve 106, a by-pass passage 134 and a check valve, and is connected also to the B2 accumulator 112 via an orifice passage.

The 3–4 shift valve 104, which serves to selectively allow and inhibit flow of the fluid through each of the branch passages 118a, 126b, is connected to the B-2 release valve 106 via a fluid passage 130, so that a pilot pressure $P_{S3}$ generated by the solenoid-operated valve S3 can be applied to an spool end of the B2 release valve 106.

The B2 release valve 106 is provided to form a by-pass circuit for facilitating a rapid discharge of the working fluid from the B2 accumulator 112 in a final stage of the releasing action of the brake B2. The pilot pressure $P_{S3}$ generated by the solenoid-operated valve S3 is supplied to the B2 release valve 106 via the 3–4 shift valve 104 such that the pilot pressure $P_{S3}$ is applied to the above-described spool end, i.e., an end of a spool 132 of the B2 release valve 106. With movement of the spool 132, the B2 release valve 106 selectively allows and inhibits fluid communication between the by-pass passage 134 and the fluid passage 128, and also fluid communication between the fluid passages 118c, 118e. Therefore, the forward-drive pressure $P_D$ is supplied to the input port 122 of the B3 control valve 108 via one of two routes, i.e., via the 1–2 shift valve 100, the branch passage 118a, the 2–3 shift valve 102, the oil passage 118e, the B2 release valve 106 and the oil passage 118c, or alternatively via the 1–2 shift valve 100, the branch passage 118b, the 3–4 shift valve 104, the B2 release valve 106 and the oil passage 118c.

With application of a feedback pressure to the spool 114 through a feedback-pressure input port 138 of the B3 control valve 108, the input port 122 is opened and closed by one of two lands of the spool 114 while a drain port EX is opened and closed by the other land of the spool 114, for thereby regulating the hydraulic pressure $P_{B3}$ of the fluid passage 124 that is connected to an output port 139 of the B3 control valve 108. This arrangement permits the hydraulic pressure $P_{B3}$ to be regulated by the B3 control valve 108 which is controlled by controlling the control pressure $P_{SLU}$ of the linear solenoid valve SLU, for assuring a required torque capacity of the brake B3 in each of the 1–2 shift-up action, 2–1 shift-down and 3–2 shift-down actions.

The plunger 116, which is disposed coaxially with the spool 114 and is abuttable on the spool 114, has two lands in its axially opposite end portions. The plunger 116 is movable toward and away from the spool 114, by the control pressure $P_{SLU}$ applied to a stepped or axially intermediate portion of the plunger 116, and the hydraulic pressure $P_{B2}$ of the brake B2 applied to an end face of the plunger 116 through the fluid passages 128, 128a and the 2–3 shift valve 102. The plunger 136, which is located on one of opposite sides of the spool 114 remote from the plunger 116, serves to vary a biasing force of a coil spring interposed between the plunger 136 and the spool 114. The forward-drive pressure $P_D$ can be applied to an end face of the plunger 136 through the fluid passage 118d, the B2 release valve 106 and the fluid passage 118b. This arrangement permits the hydraulic pressure $P_{B3}$ to be regulated according to a predetermined relationship with hydraulic pressure $P_{B3}$, for thereby reducing the torque capacity of the brake B3 at a predetermined rate.

The relay valve 110 has a spool and a coil spring which is held in contact with the spool so as to bias the spool. The hydraulic pressure $P_{B2}$ of the fluid passage 128 is applied to an end face of the spool at which the spool is in contact with the coil spring, while a line pressure $P_L$ is applied to the opposite end face of the spool, so that the spool is positioned in a position of equilibrium between a force based on a sum of the biasing force of the coil spring and the hydraulic pressure $P_{B2}$, and a force based on the line pressure $P_L$. With the positioning of the spool, the relay valve 110 establishes a selected one of the fluid communication between the fluid passage 120 of the brake B3 and the fluid passage 118a, and the fluid communication between fluid passage 120 and the fluid passage 124.

Figure 11:
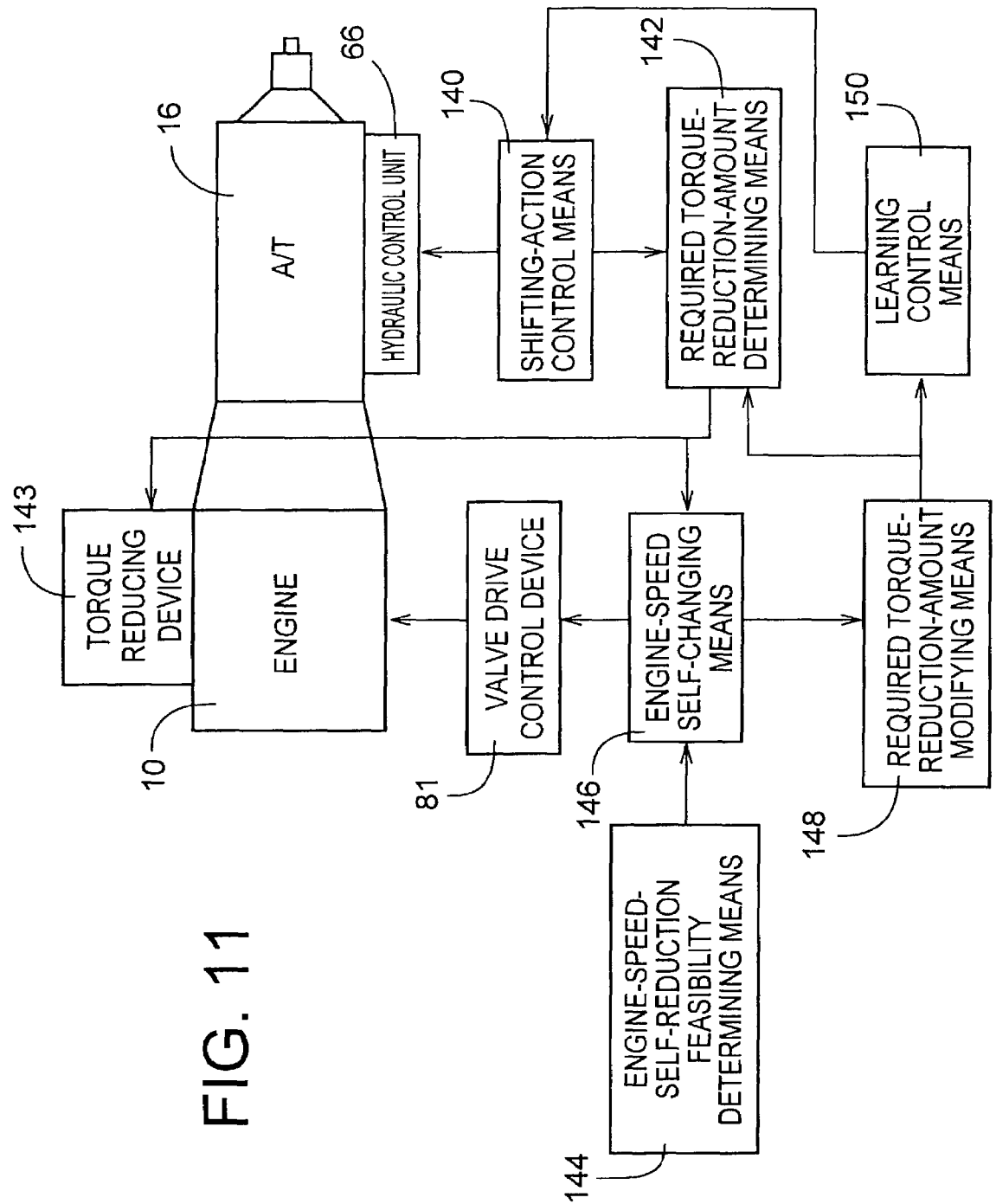
FIG. 11 is a block diagram showing major functional means of the control apparatus according to one embodiment of the invention.

Referring next to the block diagram of FIG. 11, there are illustrated major functional means of the electronic control unit 90, which includes shifting-action control means 140, required torque-reduction-amount determining means (required torque-change-amount determining means) 142, engine-speed-self-reduction feasibility determining means 144, engine-speed self-changing means 146, required torque-reduction-amount modifying means (required torque-change-amount modifying means) 148 and learning control means 150. The shifting-action control means 140 is adapted to select one of the operating positions of the automatic transmission 16 on the basis of the opening angle $\theta_{TH}$ of the throttle valve 62 (which represents a load of the engine) and the vehicle speed V, and according to predetermined shift patterns (shift boundary lines as shown in FIG. 8) which is stored in the ROM of the control unit 90. The shifting-action control means 140 controls the solenoid-operated valves S1, S2, S3 so as to establish the selected operating position of the automatic transmission 16, and energizes the solenoid-operated valve S4 when an engine brake should be applied to the vehicle.

In the process of this shifting action, an input torque $T_{IN}$ of the automatic transmission 16 is estimated, and the engaging pressure of one or ones of the hydraulically-operated frictional coupling devices (the clutches C0–C2, brakes B0–B4 and one-way clutches F0–F2) which are to be engaged to effect the shifting action, or the line pressure for the engaging pressure is adjusted to a value corresponding to the estimated input torque $T_{IN}$. For example, the 2–3 shift-up action of the automatic transmission 16 is achieved by concurrently placing the brakes B2, B3 in the engaged and released states, respectively. That is, when the 2–3 shift valve 102 is operated to shift up the automatic transmission 16 from the 2nd-speed position to the 3rd-speed position, the supply of the forward-drive pressure $P_D$ (whose original pressure corresponds to the line pressure $P_L$) to the brake B2 is initiated to increase the hydraulic pressure $P_{B2}$, for thereby placing the brake B2 in its engaged state, while the discharge of the hydraulic pressure $P_{B3}$ from the brake B3 via the relay valve 110 and the 2–3 shift valve 102 is initiated. The hydraulic pressure $P_{B2}$ of the brake B2 is gradually increased owing to the B2 accumulator 112. The spool of the relay valve 110 is gradually displaced in response to the gradual increase of the hydraulic pressure $P_{B2}$ of the fluid passage 128, for thereby switching from a position establishing the fluid communication between the fluid passages 120, 118a, to another position establishing the fluid communication between the fluid passages 120, 124. Namely, the relay valve 110 is gradually switched from its 2nd-speed position to its 3rd-speed position, whereby the working fluid is discharged from the brake B3.

Figure 14:
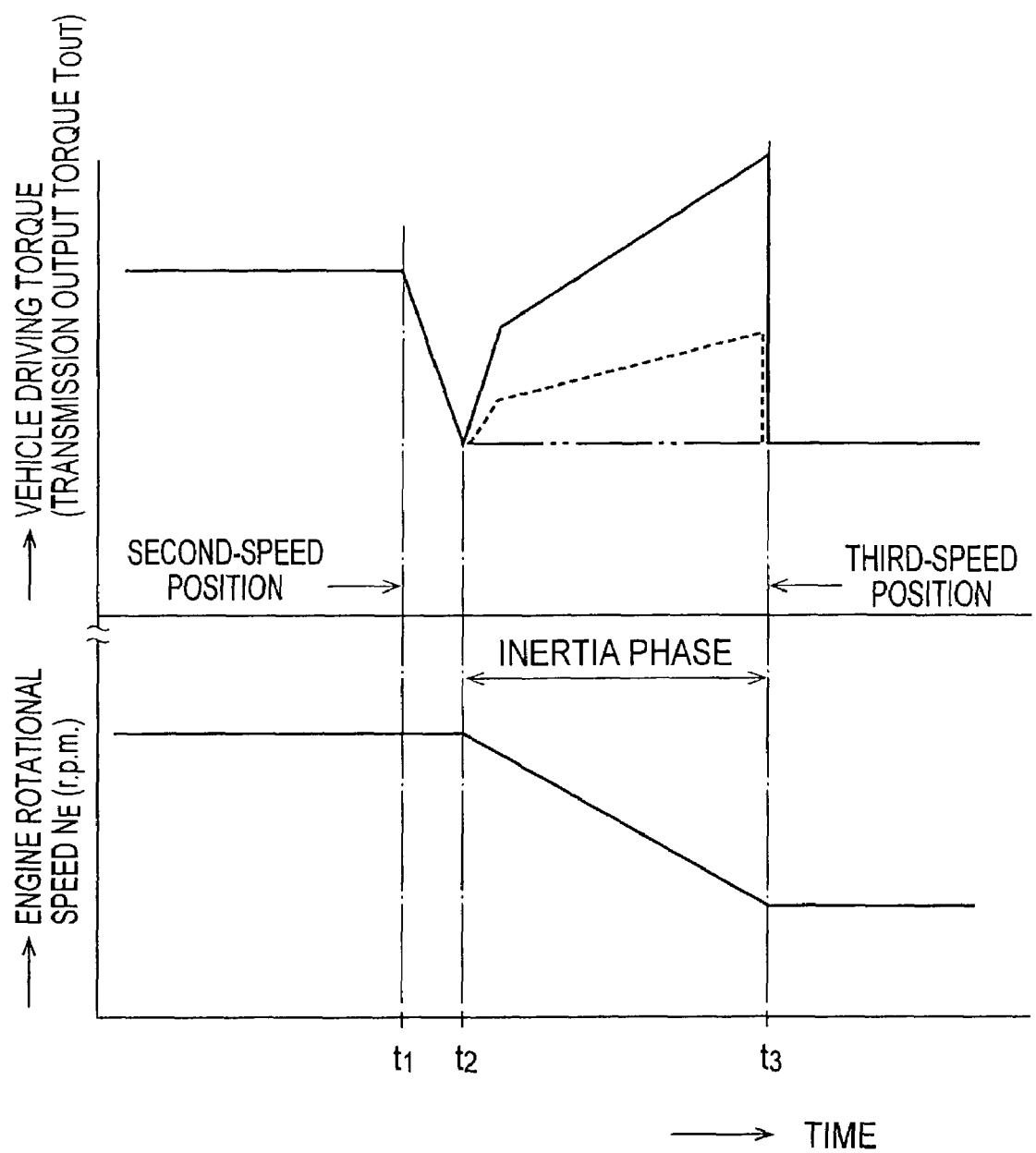
FIG. 14 is a time chart illustrating a control of the control apparatus of FIG. 11.

The spool of the relay valve 110 is positioned in a position of equilibrium between the force base on the sum of the biasing force of the coil spring and the hydraulic pressure $P_{B2}$, and the force based on the line pressure $P_L$, as described above. Since the line pressure $P_L$ is adjusted to a value corresponding to the input torque $T_{IN}$ of the automatic transmission 16, the reduction of the engaging torque of the brake B3 is delayed with an increase of the input torque $T_{IN}$ of the automatic transmission 16, namely, with an increase of the line pressure $P_L$. In the 2–3 shift-up action of the automatic transmission 16, for example, the increase of the line pressure $P_L$ restrains the reduction of the engaging torque of the brake B3 and facilitates the increase of the engaging pressure $P_{B2}$ of the brake B2. The line pressure $P_L$ is regulated such that the engine rotational speed $N_E$ is linearly reduced in an inertia phase of the shift-up action, as shown in FIG. 14. It is noted that the line pressure $P_L$ is regulated by a line-pressure regulator valve (not shown), normally, i.e., except during the shifting action of the transmission 16, such that the line pressure PL is equalized to an amount corresponding to the throttle pressure $P_{TH}$ produced by the linear solenoid valve SLT.

Figures 12, 13:
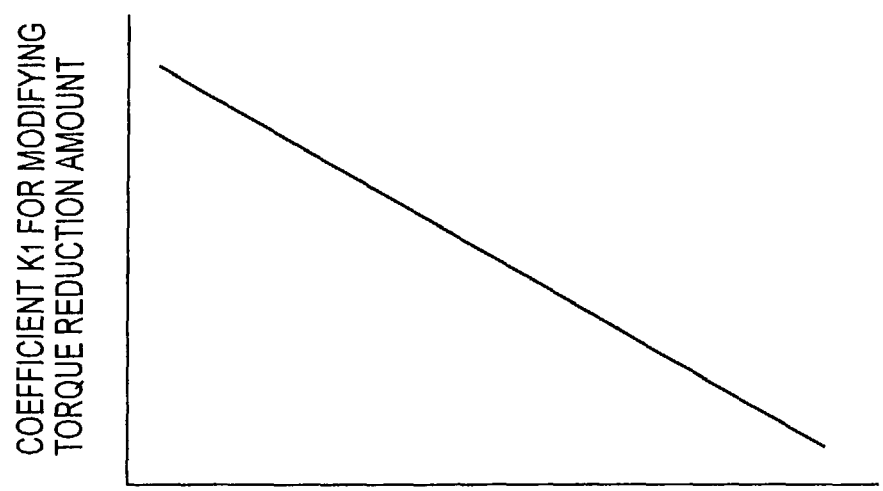
FIG. 12 is a view showing a stored relationship (data map) which is used for controlling the hydraulic control unit of the automatic transmission in a shifting action of the transmission.
FIG. 13 is a view showing a relationship between a self-reduction amount $\Delta N_E$ of an engine rotational speed $N_E$ and a compensating coefficient $K_1$ for modifying a required torque reduction amount, wherein the coefficient $K_1$ is determined on the basis of the self-reduction amount $\Delta N_E$.

In the process of the shifting action of the transmission 16, the shifting-action control means 140 is adapted to determine a drive current value of the linear solenoid valve, according to predetermined relationships in the form of a data map (as shown in FIG. 12) which is stored in the ROM of the control unit 90, on the basis of the kind of shifting action currently being in its process and the opening angle $\theta_{TH}$ of the throttle valve 62 (input torque $T_{IN}$), in such a manner that minimizes occurrence of an engine racing and a tie-up phenomenon of the hydraulically-operated frictional coupling devices. For example, in the 2–3 shift-up action of the automatic transmission 16, one of parameters b1–b8 is selected according to the data map of FIG. 12, on the basis of the opening angle $\theta_{TH}$ of the throttle valve 62, so that the electronic control unit 90 generates the drive signal $D_{SLT}$ corresponding to the selected one of the parameters b1–b8, for controlling the linear solenoid valve SLT. Namely, in the 2–3 shift-up action of the automatic transmission 16, the shifting-action control means 140 effects a hydraulic-pressure control on the basis of the input torque $T_{IN}$, so that the 2–3 shift-up action is rapidly and smoothly carried out.

The required torque-reduction-amount determining means (required torque-change-amount determining means) 142 is adapted to determine a required reduction amount by which the engine output torque $T_E$ is to be temporarily reduced during a switching of the lock-up clutch 26 from its released or slipping state to its engaged state and during a shifting action of the transmission 16, e.g., the 2–3 shift-up action. This reduction of the engine output torque $T_E$ is achieved by outputting the determined required reduction amount to a torque reducing device 143, for temporarily restraining the input torque $T_{IN}$ ($=T_E+T_I$) which is inputted from the engine 10 whose rotational speed is reduced in the shifting action, namely, for temporarily reducing the output torque $T_E$ included in the input torque $T_{IN}$ so as to alleviate a shifting shock of the transmission caused by a torque fluctuation. The torque reducing device 143 is constituted by a known device such as an ignition-timing adjusting device and the above-described throttle actuator 60. The required torque reduction amount is determined on the basis of the kind of shifting action and the vehicle running speed V, such that the reduction of the output torque $T_E$ serves to offset the increase of the inertia torque $T_I$ generated due to the reduction of the engine rotational speed $N_E$ during the shift-up action. It is noted that the inertia torque $T_I$ is constituted by an energy which is temporarily generated owing to the reduction of the rotational speed, i.e., moment of inertia during the inertia phase of the shit-up action of the transmission 16 and the inertia phase of the switching of the lock-up clutch 26 from its released or slipping state to its engaged state. In other words, the inertia torque $T_I$ corresponds to a torque generated by the engine 10, which tends to maintain its rotary motion when its rotational speed is in the process of being reduced during the inertia phase of the shit-up action of the transmission 16 and the inertia phase of the switching of the lock-up clutch 26 from its released or slipping state to its engaged state. The increase of the inertia torque $T_I$ leads to an increase of the input torque $T_{IN}$.

The engine-speed-self-reduction feasibility determining means 144 is adapted to determine whether the vehicle is placed in a state that permits the engine 10 to reduce its rotational speed $N_E$ by itself, for example, by seeing whether the above-described rotational-speed self-changing device constituted by the variable valve mechanism 78 and the valve drive control device 81 normally functions or fails to normally function.

The engine-speed self-changing means 146 is adapted to generate speed self-changing command for causing the engine 10 to change the rotational speed $N_E$ and the inertia torque $T_I$ by itself, during the inertia phase of the shift-up action, i.e., during a period when the required torque reduction amount is being outputted to the torque reducing device 143 from the required torque-reduction-amount determining means 142. The speed self-changing command is outputted to the valve drive control device 81 of the rotational-speed self-changing device, so that the rotational speed $N_E$ and the inertia torque $T_I$ are reduced owing to a rotation resistance generated by the engine 10 itself. Described more specifically, the valve drive control device 81 controls the variable valve mechanism 78 for changing at least one of a lift, a duration and an opening time of each of the intake and exhaust valves 74, 75 of each cylinder of the engine 10 in such a manner that increases the rotation resistance or intake/exhaust resistance. Such a resistance to the rotary motion of the crankshaft 79 of the engine 10 can be increased, for example, by controlling the opening and closing timing of the intake and exhaust valves 74, 75 such that the intake and exhaust valves 74, 75 are both held closed while the piston is displaced from its bottom dead center toward its top dead center. That is, the exhaust valve 75 is not opened during the upward displacement of the piston, until the piston arrives in the vicinity of the top dead center, for thereby compressing the gas within the cylinder so as to increase the resistance to the upward movement of the piston, i.e., the resistance to the rotary motion of the crankshaft 79. The rotational speed $N_E$ is thus reduced by the rotational-speed self-changing device included in the engine 10 itself, without controlling any other devices such as the transmission 16. The amount of the self-reduction of the rotational speed $N_E$ may be constant, or may be variable according to an experimentally predetermined relationship (data map) on the basis of the running speed V of the vehicle and the selected speed positions of the automatic transmission 16. This relationship is determined such that the amount of the self-reduction of the rotational speed $N_E$ is increased with an increase of the running speed V, and such that the amount of the self-reduction of the rotational speed $N_E$ is larger when the transmission 16 is placed in a relatively high speed position than when the transmission 16 is placed in a relatively low speed position.

The required torque-reduction-amount modifying means (required torque-change-amount modifying means) 148 is adapted to modify the required torque reduction amount (required torque change amount), which is determined and outputted by the required torque-reduction-amount determining means 142, on the basis of status of change of the rotational speed $N_E$ caused by the engine-speed self-changing means 146. FIG. 13 shows a relationship between an self-absorption amount of the rotational energy or self-reduction amount $\Delta N_E$ of the rotational speed $N_E$, and a compensating coefficient $K_1$ ($\leq 1$) for modifying the required torque reduction amount, wherein the compensating coefficient $K_1$ is reduced with an increase of the rotational-energy reduction amount or rotational-speed reduction amount $\Delta N_E$. The required torque-reduction-amount modifying means 148 obtains the compensating coefficient $K_1$ according to the relationship and on the basis of the rotational-energy reduction amount or rotational-speed reduction amount $\Delta N_E$, and then multiplies the required torque-reduction amount by the obtained compensating coefficient $K_1$. Thus, the required torque-reduction amount determined by the required torque-reduction-amount determining means 142 is changed or reduced to an amount corresponding to the product of the required torque-reduction amount and the compensating coefficient $K_1$. The compensating coefficient $K_1$ is reduced with an increase of the rotational-speed reduction amount $\Delta N_E$, because the increase of the rotational-speed reduction amount $\Delta N_E$ reduces the torque-reduction amount required for offsetting the inertia torque $T_I$ which is generated as a result of reduction of the engine rotational speed $N_E$ during the inertia phase of the shift-up action and which is reduced with the increase of the rotational-speed reduction amount $\Delta N_E$. The required torque-reduction amount is modified by the modifying means 148 such that the modified torque-reduction amount is held in a range between zero and 100% of the required torque-reduction amount. In FIG. 14, the solid line represents the inertia torque generated in the inertia phase of the shift-up action where the required torque-reduction amount is not modified, while the broken line represents the inertia torque where the modified torque-reduction amount corresponds to 60% of the required torque-reduction amount (where the compensating coefficient $K_1$ is 0.6).

The learning control means 150 is adapted to effect a learning compensation of the parameters a, b, c shown in FIG. 12, i.e., the drive signal for the linear solenoid valve, such that the shifting shock is reduced. The learning compensation is categorized into a learning compensation I and a learning compensation II, which are selectively effected by the learning control means 150. The learning compensation II is effected by taking account of the self-absorption amount of the rotational energy or self-reduction amount $\Delta N_E$ of the rotational speed $N_E$, while the learning compensation I is effected without taking account of the self-absorption amount or self-reduction amount $\Delta N_E$. In the present embodiment, the engine-speed self-changing means 146 serves as inertia-phase torque changing means for changing the inertia torque $T_I$ of the engine 10 during a switching of the lock-up clutch 26 from its released or slipping state to its engaged state and during a shifting action (shift-up action) of the automatic transmission 16, by controlling the resistance to the rotary motion of the engine 10.

Figure 15:
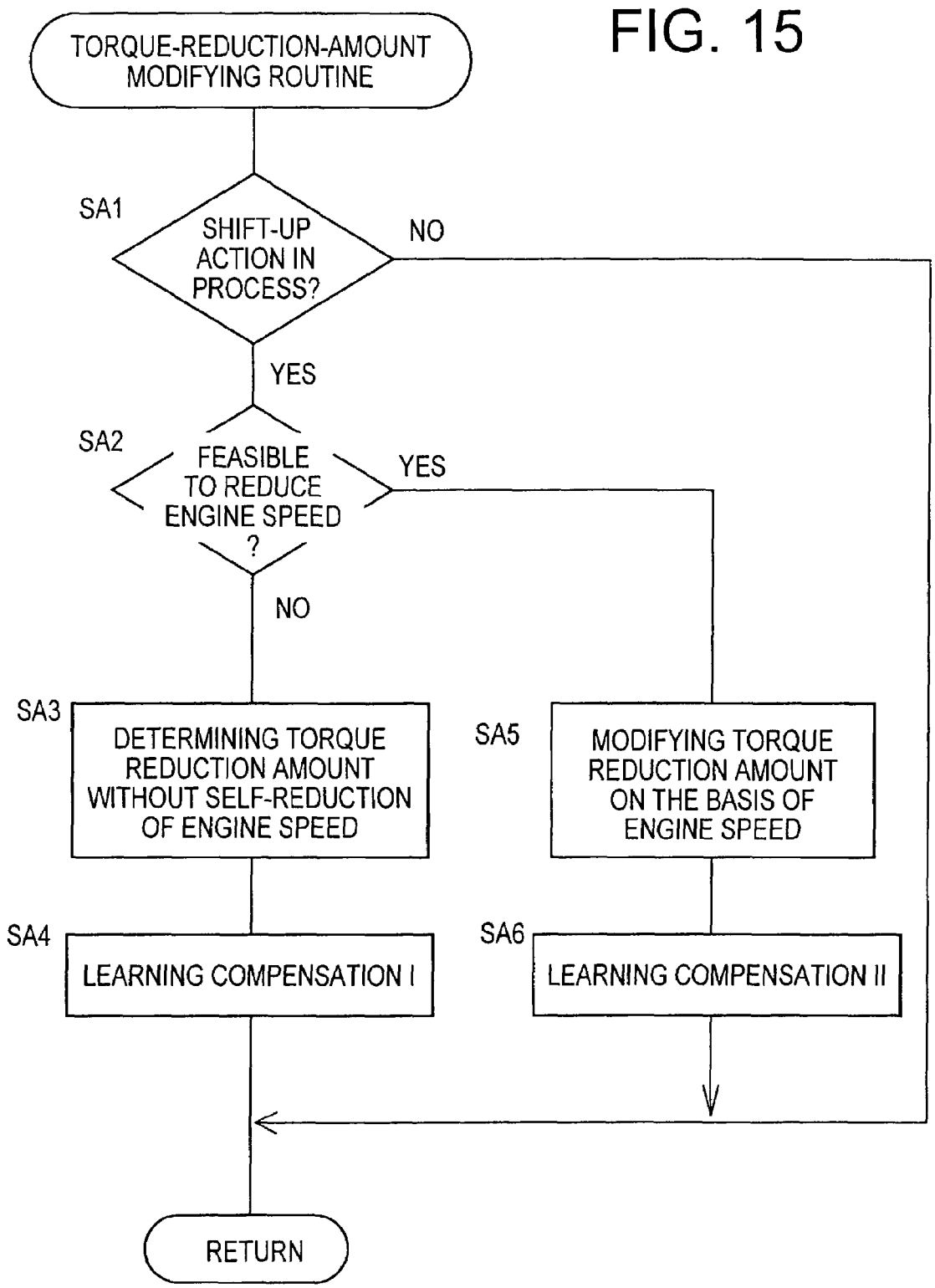
FIG. 15 is a flow chart illustrating an engine-torque-reduction-amount modifying routine which is one of control routines executed by the control apparatus of FIG. 11.

Referring next to the flow chart of FIG. 15, there will be described an engine-torque-reduction-amount modifying routine which is one of control routines executed by the electronic control unit 90. The control routine of FIG. 15 is initiated with step SA1 implemented by shifting-action determining means, to determine whether a shift-up action of the transmission 16 is being in its process, for example, on the basis of the determination made by the shifting-action control means 140 as to whether the shifting-action has been required. If a negative decision (NO) is obtained in step SA1, one cycle of execution of the control routine is terminated. If an affirmative decision (YES) is obtained in step SA1, the control flow goes to step SA2 implemented by the engine-speed-self-reduction feasibility determining means 144, to determine whether it is feasible to reduce the engine speed $N_E$ by the above-described rotational-speed self-changing device (constituted by the variable valve mechanism 78 and the valve drive control device 81). If a negative decision is obtained in step SA2, the control flow goes to step SA3 implemented by the required torque-reduction-amount determining means 142, to determine the required torque reduction amount without taking account of the self-reduction of the engine speed $N_E$, and then cause the torque reducing device 143 to reduce the output torque $T_E$ of the engine 10 according to the determined required torque reduction amount. Step SA3 is followed by step SA4 implemented by the learning control means 150, to effect the learning compensation I.

If an affirmative decision is obtained in step SA2, on the other hand, the control flow goes to step SA5 implemented by the required torque-reduction-amount modifying means 148, to obtain the compensating coefficient $K_1$ according to the stored relationship and on the basis of the rotational-energy reduction amount or rotational-speed reduction amount $\Delta N_E$, and then multiply the required torque-reduction amount by the obtained compensating coefficient $K_1$. The thus modified torque-reduction amount is outputted to the torque reducing device 143. Step SA5 is followed by step SA6 implemented by the learning control means 150, to effect the learning compensation II by taking account of the self-absorption amount of the rotational energy or self-reduction amount $\Delta N_E$ of the rotational speed $N_E$. In the time chart of FIG. 14, "$t_1$" indicates a point of time at which the automatic transmission 16 is commanded to effect the 2–3 shift-up action, so that the 2–3 shift-up action is effected during a time period between the points of time $t_1$ and $t_3$. A time period between the points of time $t_1$ and $t_2$ indicates the torque phase of the shift-up action, while the subsequent time period between the points of time $t_2$ and $t_3$ indicates the inertia phase of the shift-up action.

In the vehicle control apparatus constructed according to the present embodiment described above, when the rotational speed $N_E$ is changed by the engine 10 itself during the shifting action of the automatic transmission 16, the required torque reduction amount determined by the required torque-reduction-amount determining means 142 is modified by the required torque-reduction-amount modifying means 148 (SA5), on the basis of the status of the change of the engine rotational speed $N_E$ made by the engine 10 itself, or on the basis of the status of the reduction of the inertia torque $T_I$ made by the engine 10 itself. In this arrangement, the required torque reduction amount is changed by an amount corresponding to the amount of the self-change of the engine rotational speed $N_E$, which can be done relatively rapidly. That is, owing to this arrangement, the engine output torque $T_E$ can be changed to such an extent that sufficiently reduces the shifting shock of the transmission 16, without suffering from a limitation in an amount of retarding of an ignition timing of the engine 10, namely, without suffering from a limitation in an amount of the change of the engine output torque $T_E$ and a limitation in the timing at which the output torque $T_E$ is to be changed.

Further, in the vehicle control apparatus of the present embodiment in which the required torque-reduction-amount modifying means 148 (SA5) modifies the required torque reduction amount on the basis of the amount of the self-reduction of the engine rotational speed $N_E$, the required torque reduction amount is reduced by an amount corresponding to the amount of the self-reduction of the engine rotational speed $N_E$. Owing to this arrangement, the engine output torque $T_E$ can be reduced to such an extent that sufficiently reduces a shifting shock of the transmission 16, without suffering from a limitation in an amount of retarding of an ignition timing of the engine 10, namely, without suffering from a limitation in an amount of the change of the engine output torque $T_E$ and a limitation in the timing at which the output torque $T_E$ is to be changed.

Further, in the vehicle control apparatus of the present embodiment, the engine 10 is equipped with the rotational-speed self-changing device including the electromagnetic actuators 76, 77 for electromagnetically actuating the respective intake and exhaust valves 74, 75, and the valve drive control device 81 activated by the engine-speed self-changing means 146 to control the electromagnetic actuators 76, 77. The valve drive control device 81 controls the lift, duration and/or opening timing of each of the intake and exhaust valves 74, 75, in such a manner that increases the resistance to the rotary motion of the crankshaft 79 of the engine 10. This arrangement permits the rotational speed $N_E$ of the engine 10 to be changed within a relatively wide range with a relatively high response.

Figure 16:
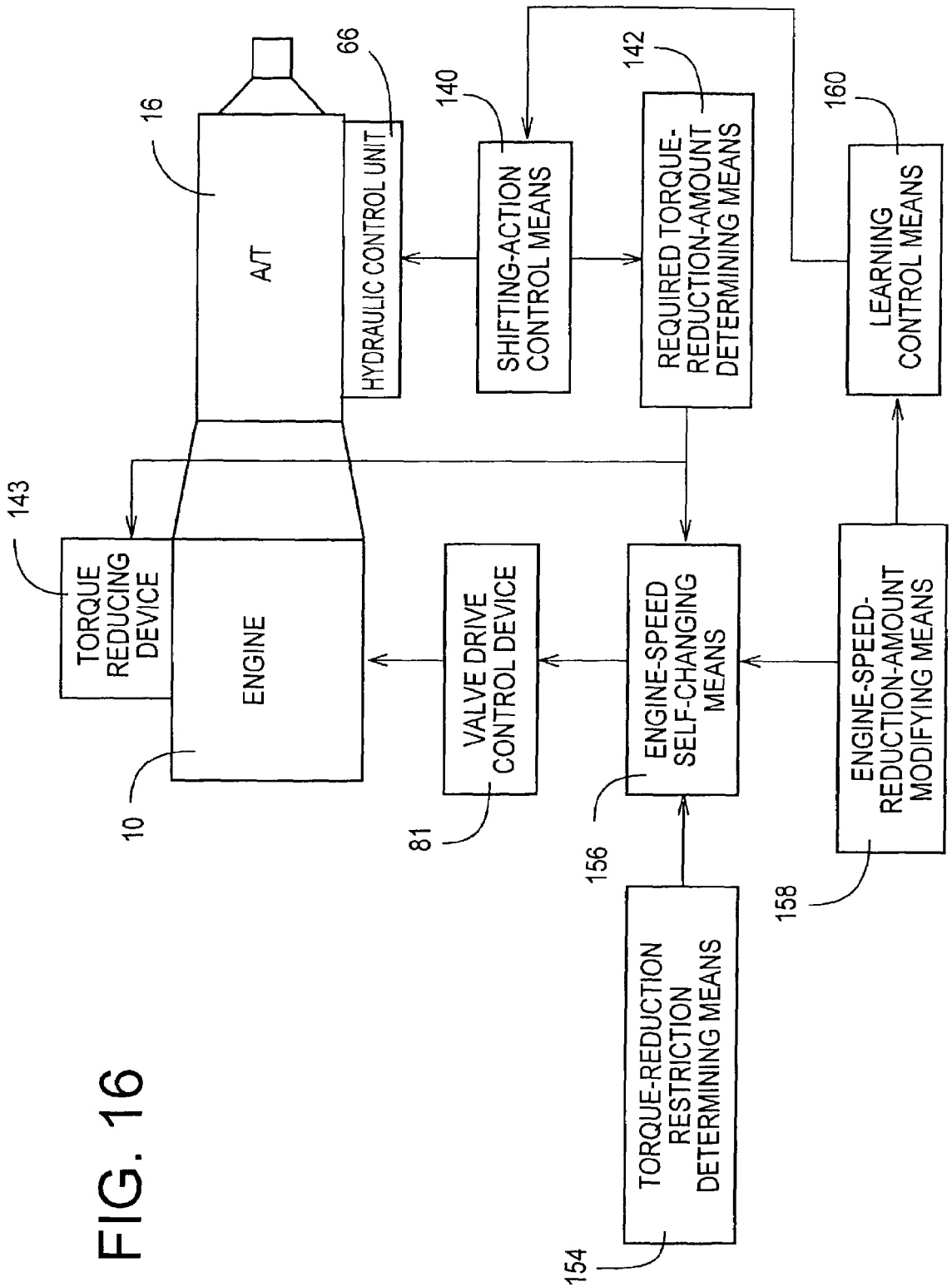
FIG. 16 is a block diagram showing major functional means of a control apparatus according to another embodiment of the invention.
Figure 17:
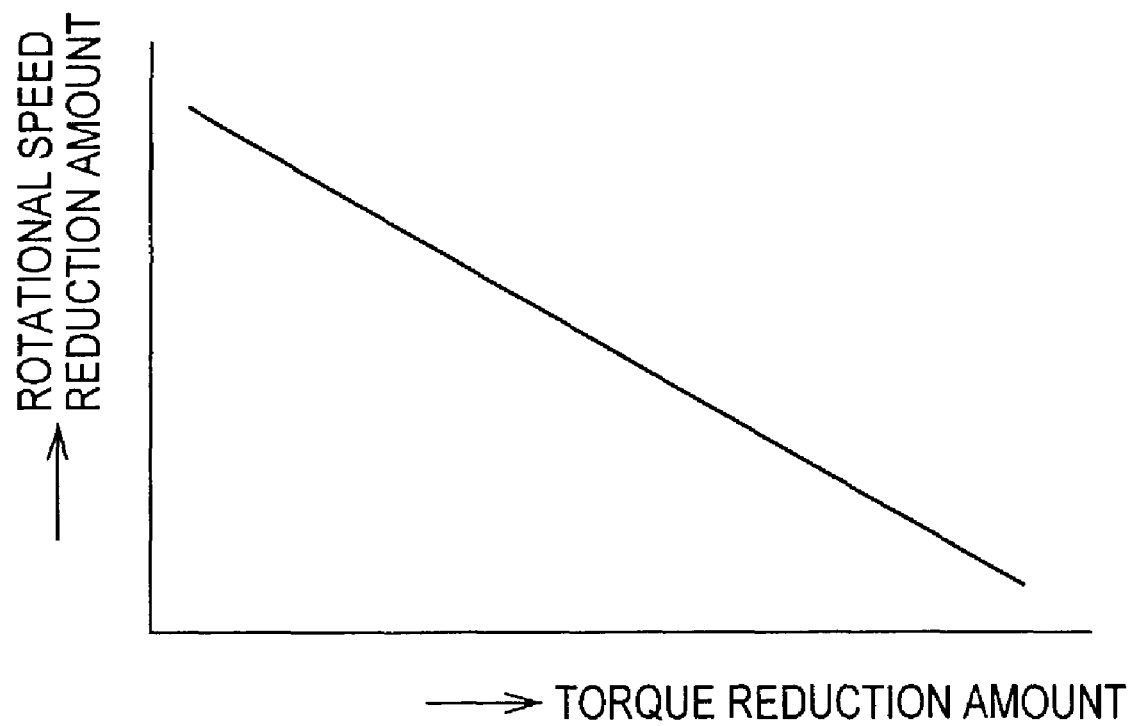
FIG. 17 is a view showing a relationship between a reduction amount of an engine torque $T_E$ and a reduction amount of an engine rotational speed $N_E$, which is determined on the basis of the reduction amount of an engine torque $T_E$.
Figure 18:
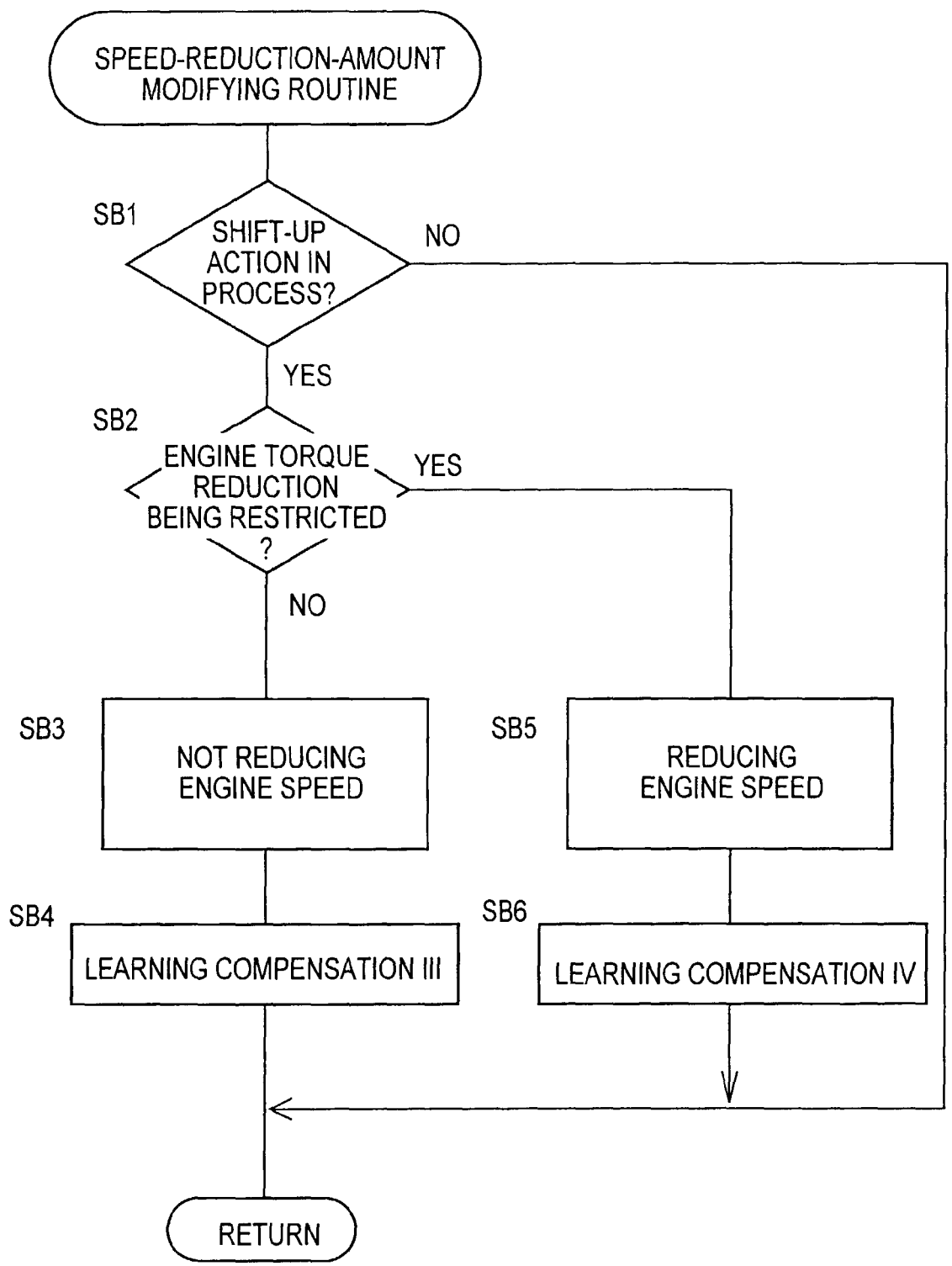
FIG. 18 is a flow chart illustrating an engine-speed-reduction-amount modifying routine which is one of control routines executed by the control apparatus of FIG. 16.

Referring to FIGS. 16–18, there will be described another embodiment of this invention, wherein the same reference signs as used in the above-described embodiment will be used to identify the functionally corresponding elements.

The block diagram of FIG. 16 illustrates major functional means of the electronic control unit 90 of the vehicle control apparatus constructed according to this embodiment. The electronic control unit 90 includes torque-reduction restriction determining means 154, engine-speed self-changing means 156, engine-speed-reduction-amount modifying means 158 and learning means 160. The torque-reduction restriction determining means 154 is adapted to determine whether the reduction of the engine output torque $T_E$ is restricted (or limited) in the process of the shifting action, e.g., in the inertia phase during the shift-up action or upon completion of the shift-down action. The restriction determining means 154 effects the determination, for example, by checking a coolant temperature and an ignition system of the engine 10. It is determined that the reduction of the output torque $T_E$ is restricted (or limited) when retarding or successive retarding of an ignition timing of the engine 10 is inhibited, namely, when the coolant temperature is smaller than a predetermined threshold, or when the ignition system fails to normally function.

If it is determined by the restriction determining means 154 that the reduction of the output torque $T_E$ is restricted, the engine-speed self-changing means 156 causes the engine 10 to reduce the rotational speed $N_E$ by itself. If it is determined by the restriction determining means 154 that the reduction of the output torque $T_E$ is not restricted, on the other hand, the engine-speed-reduction-amount modifying means 158 takes account of the amount of the output torque reduction as a result of the retarding of the ignition timing, and then modifies the rotational-speed reduction amount by which the rotational speed $N_E$ of the engine 10 is to be reduced. For example, the engine-speed-reduction-amount modifying means 158 determines the rotational-speed reduction amount according to a stored relationship as indicated in FIG. 17 and on the basis of the actual amount of the output torque reduction made by the torque reducing device 143. The modifying means 158 supplies a signal representative of the determined reduction amount, to the engine-speed self-changing means 156, so that the self-changing means 156 causes the engine 10 to reduce the rotational speed $N_E$ by the determined reduction amount. To this end, the exhaust valve 75 is closed at a point of time of the bottom dead center of the piston and is then opened at a point of time of the top dead center of the piston, while the intake valve 74 is held closed. The gas within the cylinder is thus compressed for increasing the resistance to the rotary motion of the crankshaft 79, so as to reduce the rotational speed $N_E$ of the engine 10.

The learning control means 160 is adapted to effect a learning compensation of the parameters a, b, c shown in FIG. 12, i.e., the drive signal for the linear solenoid valve, such that the shifting shock is reduced. The learning compensation is categorized into a learning compensation III and a learning compensation IV, which are selectively effected by the learning control means 160. The learning compensation III is effected in a case where the reduction of the output torque $T_E$ is not restricted, namely, where the self-reduction of the engine rotational speed $N_E$ is made merely for supplementing the output torque reduction. The learning compensation IV is effected in a case where the reduction of the output torque $T_E$ is restricted, namely, where the self-reduction of the engine rotational speed $N_E$ is made by a relatively large amount due to the restriction on the reduction of the output torque $T_E$. In the present embodiment, the engine-speed self-changing means 156 serves as inertia-phase torque changing means for changing the inertia torque $T_I$ of the engine 10 during a switching of the lock-up clutch 26 from its released or slipping state to its engaged state and during a shifting action (shift-up action) of the automatic transmission 16, by controlling the resistance to the rotary motion of the engine 10.

Referring next to the flow chart of FIG. 18, there will be described an engine-speed-reduction-amount modifying routine which is one of control routines executed by the electronic control unit 90. The control routine of FIG. 18 is initiated with step SB1 implemented by shifting-action determining means, to determine whether a shift-up action of the transmission 16 is being in its process, for example, on the basis of the determination made by the shifting-action control means 140 as to whether the shifting-action has been required. If a negative decision (NO) is obtained in step SB1, one cycle of execution of the control routine is terminated.

If an affirmative decision (YES) is obtained in step SB1, the control flow goes to step SB2 implemented by the torque-reduction restriction determining means 154, to determine whether the torque reduction of the engine 10 (which could be made by retarding the ignition timing by the torque reducing device 143) is restricted. If a negative decision is obtained in step SB2, the control flow goes to step SB3 in which the self-reduction of the engine rotational speed $N_E$ is not effected. That is, the rotational speed $N_E$ is not reduced by the rotational-speed self-changing device (constituted by the variable valve mechanism 78 and the valve drive control device 81), where there is no restriction on the torque reduction of the engine 10, namely, where it is considered that the engine output torque $T_E$ can be sufficiently reduced by the torque reducing device 143. Step SB3 is followed by step SB4 implemented by the learning control means 160, to effect the learning compensation III. It is noted that the self-reduction of the engine rotational speed $N_E$ does not have to be necessarily suspended in the step SB3 but may be effected in the step SB3. In this case, the rotational-speed reduction amount is smaller than when the torque reduction of the engine 10 is restricted.

If an affirmative decision is obtained in step SB2, on the other hand, namely, if there is a restriction on the reduction of the output torque $T_E$, the control flow goes to step SB5 implemented by the engine-speed self-changing means 156 and the engine-speed-reduction-amount modifying means 158. The modifying means 158 determines the rotational-speed reduction amount, by taking account of the amount of the output torque reduction made by the torque reducing device 143, such that the rotational-speed reduction amount is larger than the reduction amount in the above-described step SB3. The engine-speed self-changing means 156 causes the engine 10 to reduce the rotational speed $N_E$ by the determined reduction amount. That is, a difference between the required torque reduction amount (determined by the required torque-reduction-amount determining means 142) and the amount of the actual reduction of the engine output torque (made by the torque reducing device 143) is compensated by the torque reduction owing to the rotation resistance generated by the engine 10 itself. Step SB5 is followed by step SB6 implemented by the learning control means 160, to effect the learning compensation IV.

In the vehicle control apparatus constructed according to the present embodiment described above, when the output torque $N_E$ of the engine 10 is reduced according to the required torque reduction amount determined or outputted by the required torque-reduction-amount determining means 142 while the rotational speed $N_E$ is reduced by the engine 10 itself, the rotational-speed self-reduction (self-change) amount is modified by the engine-speed-reduction-amount modifying means 158 on the basis of the status of the reduction of the engine output torque $T_E$. This arrangement makes it possible to reduce the engine output torque $T_E$ to such an extent that sufficiently reduces a shifting shock of the transmission 16, even where there is a limitation in an amount of retarding of the ignition timing of the engine, namely, even where there are limitations in an amount of the change of the engine output torque $T_E$ or in the timing at which the output torque $T_E$ is to be changed.

Further, in the vehicle control apparatus of the present embodiment, the engine-speed-reduction-amount modifying means 158 modifies the rotational-speed reduction amount such that the rotational-speed reduction amount is made larger when the reduction of the output torque $T_E$ is restricted or inhibited, than when the reduction of the output torque $T_E$ is neither restricted nor inhibited. Therefore, the required reduction amount of the engine output torque $T_E$ can be reduced by an amount corresponding to the amount of the self-reduction of the engine rotational speed $N_E$, which can be done relatively rapidly. This arrangement makes it possible to reduce the engine output torque $T_E$ to such an extent that sufficiently reduces a shifting shock of the transmission 16, even where there is a limitation in an amount of retarding of the ignition timing of the engine 10, namely, even where there are limitations in an amount of the change of the engine output torque $T_E$ and in the timing at which the output torque $T_E$ is to be changed.

Further, in the vehicle control apparatus of the present embodiment, the reduction of the engine output torque $T_E$ is restricted or inhibited when the coolant temperature of the engine 10 is smaller than the predetermined threshold, namely, when successive retarding of the ignition timing of the engine 10 is restricted or inhibited. The engine-speed-reduction-amount modifying means 158 modifies the rotational-speed reduction amount, such that the rotational-speed reduction amount is made larger when the coolant temperature is smaller than the predetermined threshold than when the coolant temperature is not smaller than the predetermined threshold, or such that the rotational-speed reduction amount is made larger when retarding of the ignition timing is inhibited than when retarding of the ignition timing is not inhibited. That is, the required reduction amount of the engine output torque $T_E$ can be reduced by an amount corresponding to the amount of the self-reduction of the engine rotational speed $N_E$, which can be done relatively rapidly. This arrangement makes it possible to reduce the engine output torque $T_E$ to such an extent that sufficiently reduces a shifting shock of the transmission 16, even where there is a limitation in an amount of retarding of an ignition timing of the engine 10, namely, even where there are limitations in an amount of the change of the engine output torque $T_E$ and in the timing at which the output torque $T_E$ is to be changed.

Further, in the vehicle control apparatus of the present embodiment, the engine 10 is equipped with the rotational-speed self-changing device including the electromagnetic actuators 76, 77 for electromagnetically actuating the respective intake and exhaust valves 74, 75, and the valve drive control device 81 activated by the engine-speed self-changing means 146 to control the electromagnetic actuators 76, 77. The valve drive control device 81 controls the lift, duration and/or opening timing of each of the intake and exhaust valves 74, 75, in such a manner that increases the resistance to the rotary motion of the crankshaft 79 of the engine 10. This arrangement permits the rotational speed $N_E$ of the engine 10 to be changed within a relatively wide range with a relatively high response.

Referring to FIGS. 19–26, there will be described still another embodiment of this invention, wherein the same reference signs as used in the above-described embodiments will be used to identify the functionally corresponding elements.

Figure 19:
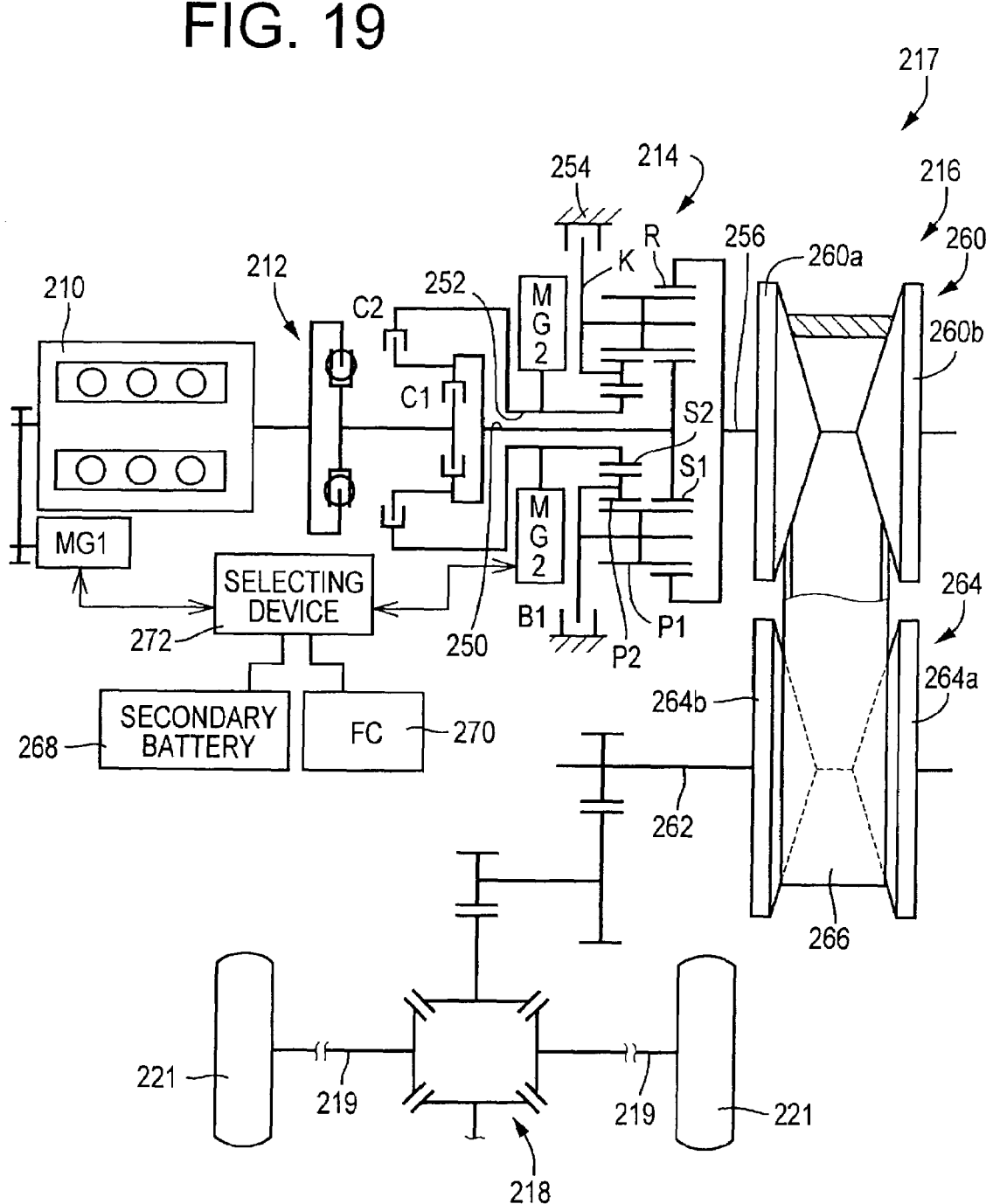
FIG. 19 is a schematic view showing a part of a drive system of an automotive vehicle, which includes an engine and an automatic transmission having a continuously-variable transmission portion and an auxiliary transmission portion, and which is controlled by a control apparatus constructed according to still another embodiment of the invention.

FIG. 19 is a schematic view showing an arrangement of a drive system of a hybrid vehicle having an engine control apparatus constructed according to still another embodiment of the invention. The drive system includes a drive power source in the form of an engine 210, a damper 212, and an automatic transmission 217 having an auxiliary transmission portion 214 and a continuously-variable transmission portion 216. An output of the engine 210 is transmitted to the automatic transmission 217 through the damper 212, and is transmitted from the automatic transmission 217 to drive wheels (e.g. front wheels) 221 through a differential gear device 218 and drive axles 219. To an input shaft of the auxiliary transmission portion 214, there is connected a motor/generator MG2 which functions as a second drive power source and an electric generator.

Like the engine 10 of the above-described embodiments, the engine 210 is a so-called "lean-burn" engine which is operated with an air-fuel mixture whose air/fuel ratio A/F is higher than the stoichiometric value, while the engine 210 is in a low-load condition. The operation with such a higher air/fuel ratio A/F serves to reduce the fuel consumption. The engine 210 has two banks of cylinders disposed on the right and left sides, wherein each of the two banks consists of three cylinders. The engine 210 is arranged such that the cylinders of one of the two banks or the cylinders of both of the two banks are operated simultaneously. Thus, the number of the cylinders to be operated can be changed. A turbocharger and a throttle valve are disposed within an intake pipe of the engine 210. The throttle valve is actuated by a throttle actuator such that an opening angle $\theta_{TH}$ of the throttle valve is in principle controlled to a value corresponding to an operating amount $\theta_{ACC}$ of an accelerator pedal (not shown). However, the opening angle $\theta_{TH}$ determined by the operating amount $\theta_{ACC}$ is automatically adjusted by an electronic control unit 280 (which will be described), depending upon various running conditions of the vehicle, so as to adjust the output of the engine 210. For instance, the angle of operating $\theta_{TH}$ is adjusted depending upon whether the automatic transmission 21 is in a shifting action or not.

To the engine 210, there is directly connected a motor/generator MG1 which functions as an electric motor and an electric generator, for starting the engine 210, driving auxiliary devices of the vehicle and converting a rotational energy of the engine 210 or a kinetic energy of the running vehicle into an electric energy.

The engine 210 has substantially the same construction as that of the engine 10 of the above-described embodiments as shown in FIG. 4. That is, the engine 210 is provided with the rotational-speed self-changing device which is constituted by the variable valve mechanism 78 and the valve drive control device 81. The variable valve mechanism 78 includes the electromagnetic actuator 76 for opening and closing the intake valve 74 of each cylinder, and the electromagnetic actuator 77 for opening and closing the exhaust valve 75 of each cylinder. The valve drive control device 81 is arranged to control the opening and closing timings of the intake and exhaust valves 74, 75, according to an output signal of the angular position sensor 80 for detecting the angular position of the crankshaft 79 of the engine 210. The valve drive control device 81 not only optimizes the opening and closing timings of the intake and exhaust valves 74, 75 depending upon a load acting on the engine 10, but also adjusts the opening and closing timings to be adapted to one of a 4-cycle operating mode and a 2-cycle operating mode which is selected according to a mode selecting signal. Further, the valve drive control device 81 controls the engine rotational speed $N_E$ for synchronizing the input and output speeds of the clutch C1 (through which the output of the engine 210 is transmitted to the drive wheels 221) during a transition from a motor drive mode to an engine drive mode of the vehicle. Each of the electromagnetic actuators 76, 77 includes the circular disc-like movable member 82 made of a magnetic material, which is connected to the intake or exhaust valve 74, 75 such that the movable member 82 is movable in the axial direction of the valve 74, 75, as shown in FIG. 5. The electromagnetic actuator 76, 77 further includes the pair of electromagnets 84, 85 disposed on the respective opposite sides of the movable member 82, and the pair of coil springs 86, 87 biasing the movable member 82 to its neutral position between the two electromagnets 84, 85. The movable member 82 is attracted by one of the two electromagnets 84, 85.

The auxiliary transmission portion 214 of the automatic transmission 217 includes Ravineaux-type planetary gear device adapted to establish a selected one of four drive positions which consist of two forward drive positions and two reverse drive positions. A gear ratio $Y_A$ of the auxiliary transmission portion 214, which corresponds to a ratio of the engine rotational speed $N_E$ to a speed of an input shaft 256 of the continuously-variable transmission portion 216, is 1, when a high-gear forward drive position is established. The gear ratio is $1/\rho_1$ when a low-gear forward drive position is established. The gear ratio is $-1/\rho_2$ when a high-gear reverse drive position is established. The gear ratio is $-1/\rho_1$ when a low-gear reverse drive position is established. The auxiliary transmission portion 214 includes a first input shaft 250 connected to the engine 210 through the first clutch C1; a second input shaft 252 connected to the engine 210 through the first and second clutches C1, C2; first and second sun gears S1, S2 fixed to the first and second input shafts 250, 252, respectively; a carrier K operatively connected to a stationary housing 254 through a brake B1; a ring gear R connected to an output shaft of the auxiliary transmission portion 214, i.e., the input shaft 256 of the continuously-variable transmission portion 216; first planetary gears P1 each having a relatively large axial length; and second planetary gears P2 each having a relatively small axial length. The first planetary gears P1 are rotatably supported by the carrier K, and mesh with the first sun gear S1 and the ring gear R. The second planetary gears P2 are rotatably supported by the carrier K, and mesh with the second sun gear S2 and the first planetary gears P1. The above-described motor/generator MG2 is connected to the second input shaft 252.

FIG. 20 is a table indicating a relationship between combinations of operating states of the clutches C1, C2 and brake B1 of the auxiliary transmission portion 214, and operating positions P, R, N, D, 2, L of the automatic transmission 217 which are established by the respective combinations. In FIG. 20, "○" indicates the engaged state of each frictional coupling device, "x" indicates the released state of each frictional coupling device, and "Δ" indicates the slipping state of each frictional coupling device. When the shift lever is placed in the operating position "D", the auxiliary transmission portion 214 is selectively placed in the high-gear (2nd) forward drive position or low-gear (1st) forward drive position. The gear ratio $Y_A$ of the auxiliary transmission portion 214 is 1, when the high-gear (2nd) forward drive position is established by placing the first and second clutches C1 and C2 in their engaged states while placing the brake B1 in its released state. The gear ratio $Y_A$ is $1/\rho_1$, when the low-gear (1st) forward drive position is established by placing the first and second clutches C1 and C2 in their released states while placing the brake B1 in its engaged state. When the shift lever is placed in the operating position "R", the auxiliary transmission portion 214 is selectively placed in the high-gear rear drive position or low-gear reverse drive position. The gear ratio $Y_A$ of the auxiliary transmission portion 214 is $-1/\rho_2$, when the high-gear rear drive position is established by placing the first clutch C1 and the brake B1 in their engaged states while placing the second clutch C2 in its released state. The gear ratio $Y_A$ of the auxiliary transmission portion 214 is $-1/\rho_1$, when the low-gear rear drive position is established by placing the first and second clutches C1, C2 in their released states while placing the brake B1 in its engaged state. It is noted that each of the clutches C1, C2 and brake B1 is provided by a hydraulically-operated frictional coupling device which is actuated by a hydraulic actuator.

For driving the vehicle in a reverse direction, the second motor/generator MG2 is rotated in the reverse direction, and the reverse rotary motion of the second motor/generator MG2 is transmitted to the second sun gear S2. While the vehicle is held stationary, a creep force is generated by the second motor/generator MG2 whether the shift lever is placed in the operating position "D" or in the operating position "R". Thus, even when the electric energy amount stored in a secondary battery 268 is insufficient, the secondary battery 268 is charged with the electric energy generated by the first motor/generator MG1 which is activated by starting the engine 210, so that the vehicle can be started with the second motor/generator MG2 as the drive power source except in the event of a failure of this vehicle drive system. During the reverse running of the vehicle, the second motor/generator MG2 is driven in the reverse direction so as to generate the creep force, and optionally the engine 210 is started as needed. While the vehicle is running at a low speed, the clutch C1 is held in its slipping state. For driving the vehicle in a forward direction, the vehicle is started by the second motor/generator MG2 which generates the creep torque, meanwhile the engine 210 is started by the motor generator MG1. When the input and output speeds of the clutch C1 are synchronized with each other, the vehicle begins to be driven by the engine 210 with the auxiliary transmission portion 214 being placed in the high-gear (2nd) forward drive position. The vehicle can be started also by the engine 210 with the clutch C1 being held in its slipping state. In this case, the running velocity V of the vehicle is gradually increased by the slipping engagement of the clutch C1, and the clutch C1 is then placed in its engaged state when the running velocity V has been increased to a predetermined value. The auxiliary transmission portion 214 establishes the plurality of drive positions providing the different vehicle running speeds, although the auxiliary transmission portion 214 has the relatively small number of rotary elements. When the drive power source should be switched from the motor/generator MG2 to the engine 210 during the reverse running of the vehicle, the brake B1 can be held in its engaged state without changing the operating state.

Referring back to FIG. 19, the continuously-variable transmission portion 216 of the automatic transmission 217 includes an input-side variable-diameter pulley 260 which is mounted on the input shaft 256 and whose effective diameter is variable, an output-side variable-diameter pulley 264 which is mounted on an output shaft 262 and whose effective diameter is variable, and a transmission belt 266 which engages V-grooves defined in the respective variable-diameter pulleys 260, 264. The drive force is transmitted between the two variable-diameter pulleys 260, 264 through a frictional contact of the transmission belt 266 serving as a power transmitting member with the surfaces of the V-grooves of the pulleys 260, 264. The input-side variable-diameter pulley 260 includes a fixed body 260a which is fixed to the input shaft 256, and a movable body 260b which is axially movable but is not rotatable relative to the input shaft 256. The output-side variable-diameter pulley 264 includes a fixed body 264a which is fixed to the output shaft 262, and a movable body 264b which is axially movable but is not rotatable relative to the output shaft 262. The variable-diameter pulley 260 has an input-side hydraulic cylinder (not shown) operable to move the movable body 260b toward and away from the fixed body 260a, for thereby adjusting a gripping force with which the transmission belt 266 is gripped by and between the fixed and movable bodies 260a, 260b. The variable-diameter pulley 264 has an output-side hydraulic cylinder (not shown) operable to move the movable body 264b toward and away from the fixed body 264a, for thereby adjusting a gripping force with which the transmission belt 266 is gripped by and between the fixed and movable bodies 264a, 264b. In general, the input-side hydraulic cylinder is activated mainly to change a speed reduction ratio $Y_{CVT}$ of the continuously-variable transmission portion 216, which ratio corresponds to a ratio of a rotational speed $N_{IN}$ of the input shaft 256 to a rotational speed $N_{OUT}$ of the output shaft 262. The output-side hydraulic cylinder is activated mainly to adjust a tensile strength of the transmission belt 266.

The vehicle drive system includes the above-described secondary battery 268 such as a chargeable lead storage batter, and a fuel cell 270 which generates an electric energy based on a fuel substance such as hydrogen. One of the secondary battery 268 and the fuel cell 270 is selected by a selecting device 272, so as to serve as an electric power source for the first motor/generator MG1 and/or the second motor/generator MG2.

Figure 21:
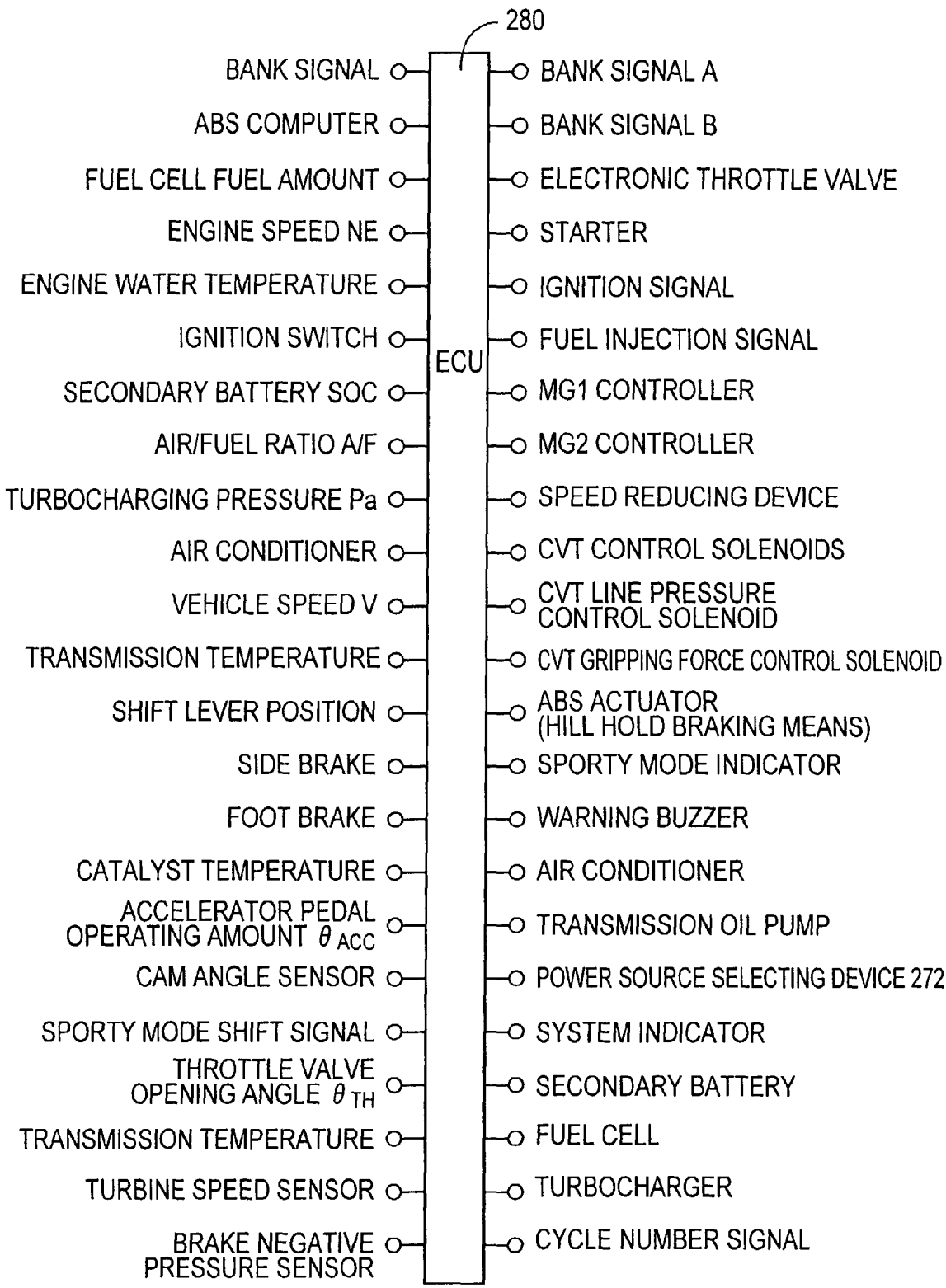
FIG. 21 is a view for explaining input and output signals of the control apparatus in the form of an electronic control unit (ECU) used for the vehicle provided with the drive system of FIG. 19.

The vehicle drive system is controlled by an electronic control unit (ECU) 280, the input and output signals of which are indicated in FIG. 21. The electronic control unit 280 receives, as its input signals, the following output signals of various sensors (not shown): an accelerator signal indicative of the operating amount or angle $\theta_{ACC}$ of the accelerator pedal; a vehicle speed signal indicative of a rotational speed $N_{OUT}$ of the output shaft 262 of the automatic transmission 217, which can be used to detect a running speed V of the vehicle; an engine speed signal indicative of the speed $N_E$ of the engine; a signal indicative of the turbocharging pressure Pa in the intake pipe; a signal indicative of the air/fuel ratio A/F of the air-fuel mixture; and a signal indicative of a presently selected operating position $S_H$ of the shift lever. The electronic control unit 280 generates the following output signals: a fuel injection signal for controlling an amount of fuel to be injected from a fuel injector valve into each cylinder of the engine 210; solenoid drive signals for controlling solenoid coils of solenoid-operated valves for driving shift control valves incorporated in a hydraulic control unit 278, to change the speed reduction ratio $Y_{CVT}$ of the continuously-variable transmission portion 216; a tension control signal for controlling the tension of the transmission belt 266 of the continuously-variable transmission portion 216; and a mode selecting signal for commanding the engine 210 to be operated in one of the 2-cycle and 4-cycle operating modes.

The electronic control unit 280 includes a so-called microcomputer incorporating a central processing unit (CPU), a read-only memory (ROM), a random-access memory (RAM), and an input-output interface. The CPU operates to effect signal processing operations according to control programs stored in the ROM, while utilizing a temporary data storage function of the RAM, for executing various control routines such as: a speed-reduction-ratio control routine for holding the speed reduction ratio $Y_{CVT}$ of the continuously-variable transmission portion 216 at an optimum value; a tension control routine for holding the tension of the transmission belt 266 at an optimum value; and a drive-power-source selecting routine for selecting one of the engine 210 and the motor/generator MG2 as the drive power source.

For instance, the speed-reduction-ratio control routine is formulated to first determine a target speed-reduction ratio $Y_{CVT}^*$ on the basis of the detected operating amount or angle $\theta_{ACC}$ (%) of the accelerator pedal and the detected vehicle running speed V and according to a predetermined relationship, and then activate the above-described input-side hydraulic cylinder in such a manner that equalizes the actual speed-reduction ratio $Y_{CVT}$ to the target speed-reduction ratio $Y_{CVT}^*$. The tension control routine is formulated to first calculate a basic gripping force on the basis of the detected angle $\theta_{TH}$ of opening of the throttle valve, the detected rotational speed $N_E$ and the actual gear ratio $Y_A$ of the auxiliary transmission portion 214 and according to a predetermined relationship, and then modify the basic gripping force on the basis of the actual temperature $T_{OIL}$ of the working fluid used for the auxiliary transmission portion 214 and the amplitude of torque vibration or the selected engine cycle, so that the output-side hydraulic cylinder is controlled such that the transmission belt 266 gripped with the modified gripping force is given an optimum value of tension. The drive-power-source selecting routine is formulated to determine whether a switching of the drive power source and a shifting action of the auxiliary transmission portion 214 are required or not, on the basis of the running velocity V and the torque $T_{OUT}$ of the output shaft 262 of the automatic transmission 217 and according to a predetermined relationship, so that the switching of the drive power source and the shifting action of the auxiliary transmission portion 214 are effected as needed.

When a forward running of the vehicle is initiated with a shift lever (not shown) being placed in a forward-driving position "D", the vehicle is driven by the motor/generator MG2 which generates the creep torque. In this instance, the brake B1 is held in its engaged state while the auxiliary transmission portion 214 is placed in the low-gear (1st) forward drive position in which the gear ratio $Y_A$ is $1/\rho_1$. As the vehicle running speed V is increased to a predetermined amount, the engine 210 is started and controlled in such a manner that synchronizes the input and output rotational speeds of the clutch C1. The clutch C1 is placed in its engaged state upon completion of the synchronization, whereby the vehicle begins to be driven by the engine 210 as the drive power source. Even if the electric energy amount stored in the secondary battery 268 is insufficient, the secondary battery 268 can be charged with the electric energy generated by the first motor/generator MG1 which is activated by starting the engine 210, so that the vehicle can be started with the second motor/generator MG2 as the drive power source except in the event of a failure of this vehicle drive system. The vehicle can be started also by the engine 210 in place of the motor/generator MG2, for example, when the vehicle has to be driven with a large driving force. In this case, the running speed V is gradually increased by the slipping engagement of the clutch C1, and the clutch C1 is placed in its fully-engaged state when the running speed V has been increased to a predetermined level.

When a reverse running of the vehicle is initiated with the shift lever being placed in a reverse-driving position "R", the vehicle is driven by the motor/generator MG2 which is rotated in the reverse direction and generates the creep torque. In this instance, the brake B1 is held in its engaged state while the auxiliary transmission portion 214 is placed in the low-gear (1st) reverse drive position in which the gear ratio $Y_A$ is $-1/\rho_1$. As the vehicle running speed V is increased to a predetermined amount, the engine 210 is started and controlled in such a manner that synchronizes the input and output rotational speeds of the clutch C1. When the motor drive mode is switched to the engine drive mode, the brake B1 can be held in its engaged state without changing the operating state. When the drive torque has be increased as a result of increase of the running speed V, the engine 210 is started while the clutch C1 is placed in its slipping state.

Figure 22:
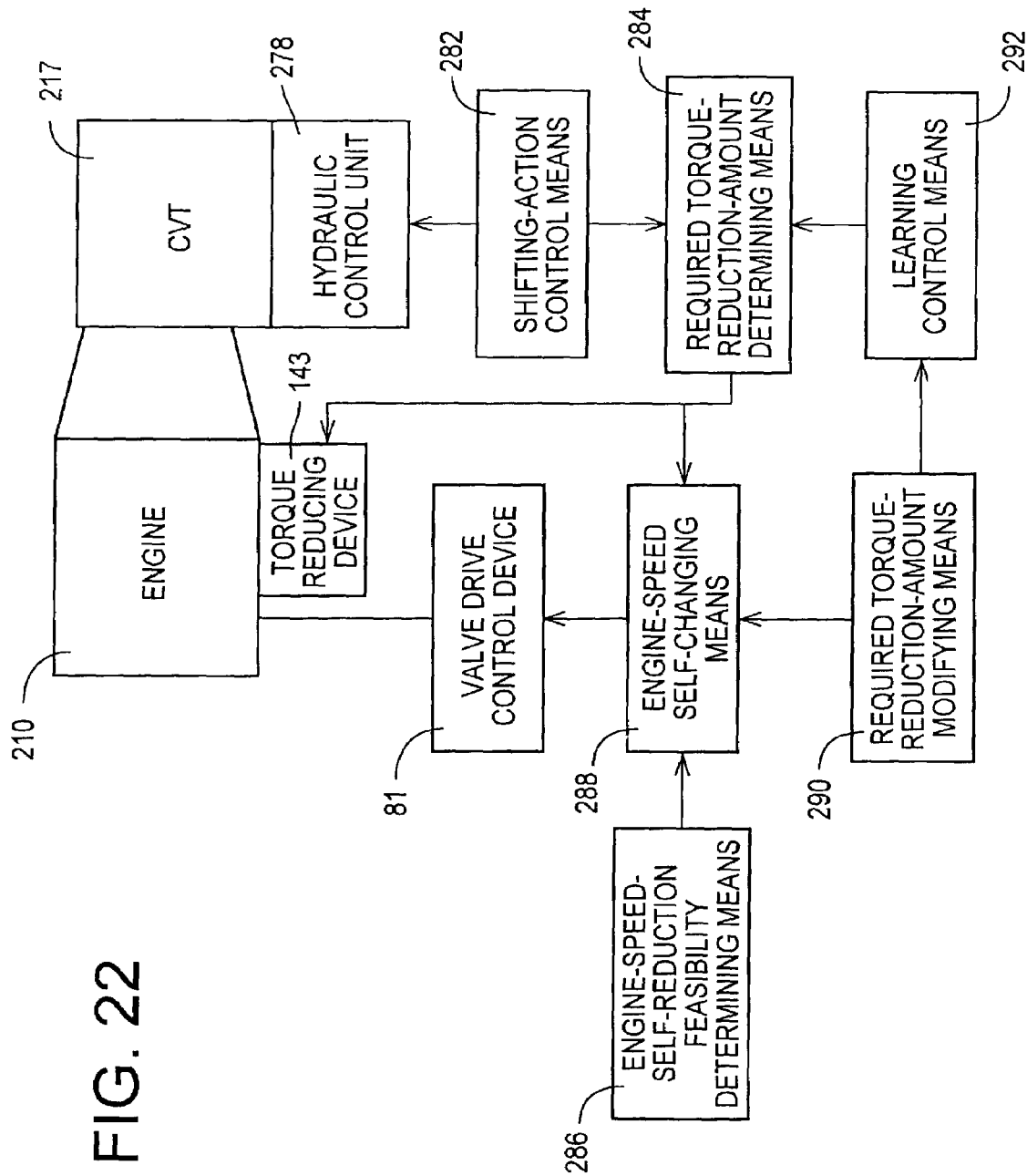
FIG. 22 is a block diagram showing major functional means of the control apparatus of FIG. 21.
Figure 23:
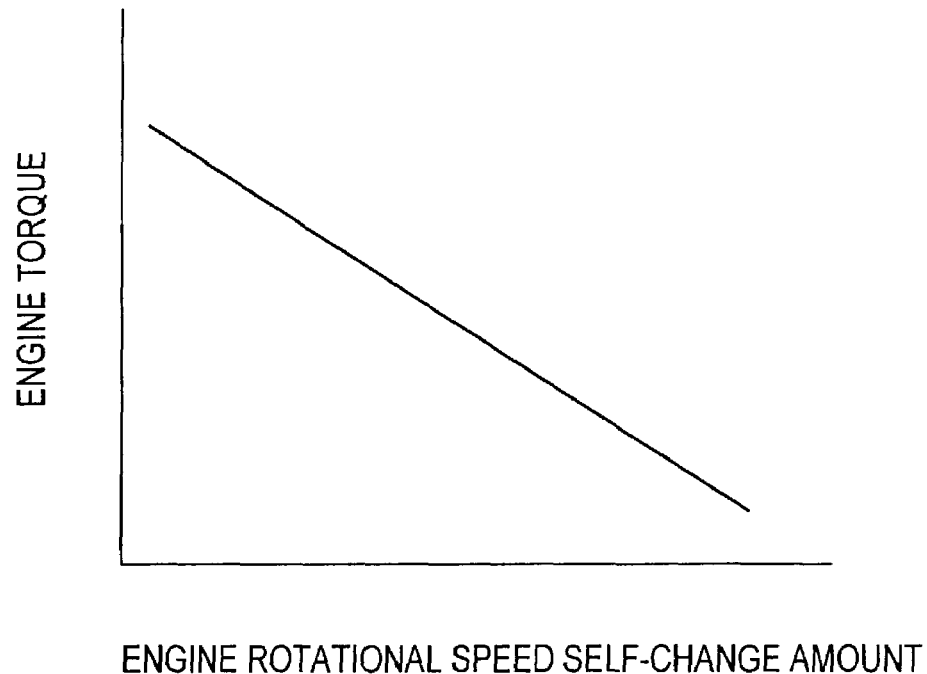
FIG. 23 is a view showing a relationship between en engine torque, and an amount of an engine-rotational-speed change which is made by adjusting a resistance to a rotary motion of the engine.
Figure 24:
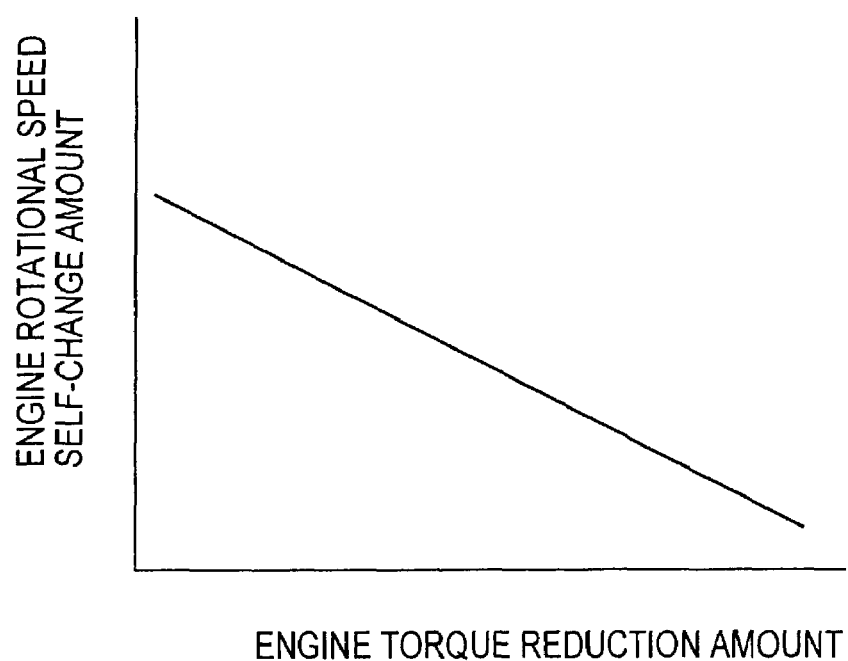
FIG. 24 is a view showing a relationship between an amount of the engine-rotational-speed change, and an amount of an engine torque reduction which is made by adjusting the resistance to the rotary motion of the engine.

Referring next to the block diagram of FIG. 22, there are illustrated major functional means of the electronic control unit 280, which includes shifting-action control means 282, required torque-reduction-amount determining means (required torque-change-amount determining means) 284, engine-speed-self-reduction feasibility determining means 286, engine-speed self-changing means 288, required torque-reduction-amount modifying means (required torque-change-amount modifying means) 290 and learning control means 292. The shifting-action control means 282 is adapted to determine the target speed-reduction ratio $Y_{CVT}^*$ on the basis of the detected operating amount or angle $\theta_{ACC}$ (%) of the accelerator pedal and the detected vehicle running speed V and according to a predetermined relationship, and then activate the above-described input-side hydraulic cylinder in such a manner that equalizes the actual speed-reduction ratio $Y_{CVT}$ to the target speed-reduction ratio $Y_{CVT}^*$. The required torque-reduction-amount determining means (required torque-change-amount determining means) 284 is adapted to determine a required reduction amount by which the engine output torque $T_E$ is to be temporarily reduced in a shifting action of the automatic transmission 217, e.g., a shift-up action of the transmission 217. This reduction of the engine output torque $T_E$ is achieved by outputting the determined required reduction amount to the above-described torque reducing device 143, for temporarily restraining the input torque $T_{IN}$ ($=T_E+T_I$) which is inputted from the engine 10 whose rotational speed is reduced in the shifting action, namely, for temporarily reducing the output torque $T_E$ included in the input torque $T_{IN}$ so as to alleviate a shifting shock of the transmission caused by a torque fluctuation. The required torque reduction amount is determined on the basis of the kind of shifting action and the vehicle running speed V, such that the reduction of the output torque $T_E$ serves to offset the increase of the inertia torque $T_I$ generated due to the reduction of the engine rotational speed $N_E$ during the shift-up action. The engine-speed-self-reduction feasibility determining means 286 is adapted to determine whether the vehicle is placed in a state that permits the engine 210 to reduce its rotational speed $N_E$ by itself, for example, by seeing whether the above-described rotational-speed self-changing device constituted by the variable valve mechanism 78 and the valve drive control device 81 normally functions or fails to normally function.

The engine-speed self-changing means 288 is adapted to generate a speed self-changing command for causing the engine 210 to change the rotational speed $N_E$ and the inertia torque $T_I$ by itself, during the shift-up action, i.e., during a period when the required torque reduction amount is being outputted to the torque reducing device 143 from the required torque-reduction-amount determining means 284. The speed self-changing command is outputted to the valve drive control device 81 of the rotational-speed self-changing device, so that the rotational speed $N_E$ and the inertia torque $T_I$ are reduced owing to a rotation resistance generated by the engine 210 itself. Described more specifically, the valve drive control device 81 controls the variable valve mechanism 78 for changing at least one of a lift, a duration and an opening time of each of the intake and exhaust valves 74, 75 of each cylinder of the engine 210, for thereby increasing the rotation resistance or intake/exhaust resistance in such a manner that establishes an engine-torque reduction amount determined based on a relationship shown in FIG. 24, which relationship is obtained from a property of the engine 210 shown in FIG. 23. Such a resistance to the rotary motion of the crankshaft 79 of the engine 10 can be increased, for example, by controlling the opening and closing timing of the intake and exhaust valves 74, 75 such that the intake and exhaust valves 74, 75 are both held closed while the piston is displaced from its bottom dead center toward its top dead center. That is, the exhaust valve 75 is not opened during the upward displacement of the piston, until the piston arrives in the vicinity of the top dead center, for thereby compressing the gas within the cylinder so as to increase the resistance to the upward movement of the piston, i.e., the resistance to the rotary motion of the crankshaft 79. The rotational speed $N_E$ is thus reduced by the rotational-speed self-changing device included in the engine 10 itself, without controlling any other devices such as the transmission 16. The amount of the self-reduction of the rotational speed $N_E$ may be constant, or may be variable according to an experimentally predetermined relationship (data map) on the basis of the running speed V of the vehicle and the selected speed positions of the automatic transmission 16. This relationship is determined such that the amount of the self-reduction of the rotational speed $N_E$ is increased with increase of the running speed V, and such that the amount of the self-reduction of the rotational speed $N_E$ is larger when the transmission 16 is placed in a relatively high speed position than when the transmission 16 is placed in a relatively low speed position.

The required torque-reduction-amount modifying means (required torque-change-amount modifying means) 290 is adapted to modify the required torque reduction amount (required torque change amount), which is determined and outputted by the required torque-reduction-amount determining means 284, on the basis of status of change of the rotational speed $N_E$ caused by the engine-speed self-changing means 288. FIG. 13 shows a relationship between a self-absorption amount of the rotational energy or self-reduction amount $\Delta N_E$ of the rotational speed $N_E$, and a compensating coefficient $K_1$ ($\leq 1$) for modifying the required torque reduction amount, wherein the compensating coefficient $K_1$ is reduced with an increase of the rotational-energy reduction amount or rotational-speed reduction amount $\Delta N_E$. The required torque-reduction-amount modifying means 290 obtains the compensating coefficient $K_1$ according to the relationship and on the basis of the rotational-energy reduction amount or rotational-speed reduction amount $\Delta N_E$, and then multiplies the required torque-reduction amount by the obtained compensating coefficient $K_1$. Thus, the required torque-reduction amount determined by the required torque-reduction-amount determining means 284 is changed or reduced to an amount corresponding to the product of the required torque-reduction amount and the compensating coefficient $K_1$. The compensating coefficient $K_1$ is reduced with an increase of the rotational-speed reduction amount $\Delta N_E$, because the increase of the rotational-speed reduction amount $\Delta N_E$ reduces the torque-reduction amount required for offsetting the inertia torque $T_I$ which is generated as a result of reduction of the engine rotational speed $N_E$ during the inertia phase of the shift-up action and which is reduced with the increase of the rotational-speed reduction amount $\Delta N_E$. The required torque-reduction amount is modified by the modifying means 290 such that the modified torque-reduction amount is held in a range between zero and 100% of the required torque-reduction amount. In FIG. 14, the solid line represents the inertia torque generated in the inertia phase of the shift-up action where the required torque-reduction amount is not modified, while the broken line represents the inertia torque where the modified torque-reduction amount corresponds to 60% of the required torque-reduction amount (where the compensating coefficient $K_1$ is 0.6).

The learning control means 292 is adapted to effect a learning compensation of the drive signal for the linear solenoid valve such that the shifting shock is reduced. The learning compensation is categorized into a learning compensation V and a learning compensation VI, which are selectively effected by the learning control means 292. The learning compensation VI is effected by taking account of the self-absorption amount of the rotational energy or self-reduction amount $\Delta N_E$ of the rotational speed $N_E$, while the learning compensation V is effected without taking account of the self-absorption amount or self-reduction amount $\Delta N_E$. In the present embodiment, the engine-speed self-changing means 288 serves as inertia-phase torque changing means for changing the inertia torque $T_I$ of the engine 210 during a shifting action (shift-up action) of the automatic transmission 217, by controlling the resistance to the rotary motion of the engine 210.

Figure 25:
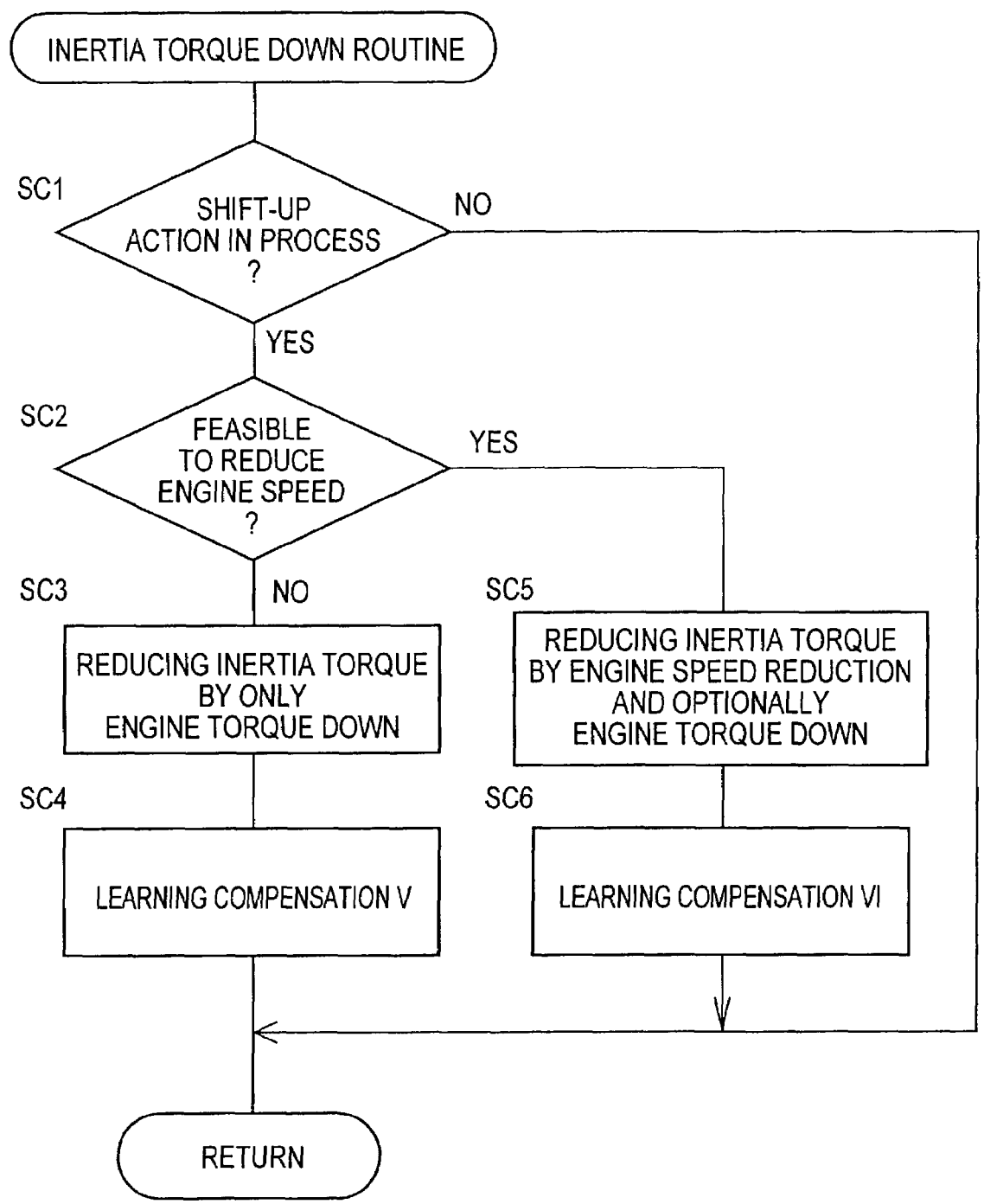
FIG. 25 is a flow chart illustrating an inertia torque down routine which is one of control routines executed by the control apparatus of FIG. 21.

Referring next to the flow chart of FIG. 25, there will be described an inertia torque down routine which is one of control routines executed by the electronic control unit 280. This routine of FIG. 25 is initiated with step SC1 implemented by the shifting-action determining means, to determine whether a shift-up action of the transmission 217 is being in its process, for example, on the basis of the determination made by the shifting-action control means 282 as to whether the shifting-action has been required. If a negative decision (NO) is obtained in step SC1, one cycle of execution of the control routine is terminated. If an affirmative decision (YES) is obtained in step SC1, the control flow goes to step SC2 implemented by the engine-speed-self-reduction feasibility determining means 286, to determine whether it is feasible to reduce the engine speed $N_E$ by the above-described rotational-speed self-changing device (constituted by the variable valve mechanism 78 and the valve drive control device 81). If a negative decision is obtained in step SC2, namely, if the rotational speed $N_E$ or the inertia torque $T_I$ of the engine 210 can not be reduced by increasing the resistance to the rotary motion of the engine 210, the output torque $T_E$ of the engine 210 is reduced by the required reduction amount determined by the required torque-reduction-amount determining means 284, by retarding the ignition timing and/or reducing the opening angle $\theta_{TH}$ of the throttle valve 62, so that the input toque (including the inertia torque) transmitted from the engine 210 to the automatic transmission 217 is temporarily reduced. Step SC3 is followed by step SC4 implemented by the learning control means 292, to effect the learning compensation V in view of an amount of the retarding of the ignition timing and/or an amount of the reduction of the opening angle $\theta_{TH}$ of the throttle valve 62.

If an affirmative decision is obtained in step SC2, on the other hand, the control flow goes to step SC5 implemented by the engine-speed self-changing means 288, to activate the above-described rotational-speed self-changing device to reduce the engine speed $N_E$. In this instance, the input torque (including the inertia torque) transmitted from the engine 210 to the automatic transmission 217 may be reduced not only by the activation of the rotational-speed self-changing device but also by retarding the ignition timing and/or reducing the opening angle $\theta_{TH}$ of the throttle valve 62. Step SC5 is followed by step SC6 implemented by the learning control means 292, to effect the learning compensation VI.

This learning compensation VI is effected differently where the output torque $T_E$ of the engine 210 is reduced (by retarding the ignition timing and/or reducing the opening angle $\theta_{TH}$ of the throttle valve 62) in addition to the self-reduction of the engine speed $N_E$, from where the input torque transmitted to the transmission 217 is reduced by only the self-reduction of the engine speed $N_E$.

Figure 26:
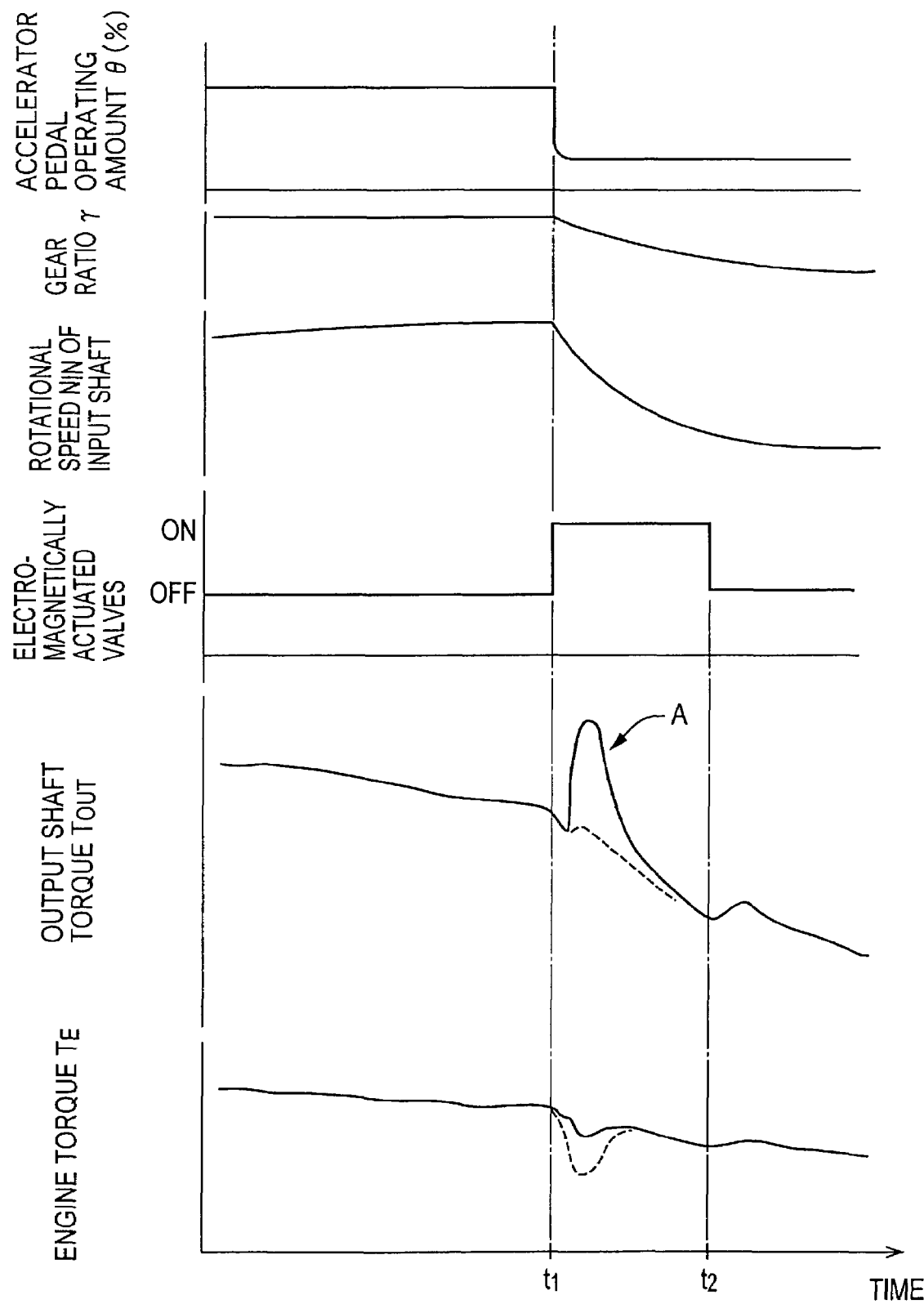
FIG. 26 is a time chart illustrating a control of the control apparatus of FIG. 21.

FIG. 26 is a time chart illustrating a control of the control apparatus in the form of the electronic control unit 280. In the time chart of FIG. 26, "$t_1$" indicates a point of time at which a shifting-up action is initiated by releasing the accelerator pedal toward its non-operated position. During a time period between the points of time $t_1$ and $t_2$, the electromagnetically-actuated intake and exhaust valves 74, 75 are actuated such that the engine torque $T_E$, i.e., the inertia torque $T_I$ represented by the solid line is reduced, as represented by the broken line, owing to the self-resistance to the rotary motion of the engine 210. As a result of the reduction of the engine torque $T_E$ or the inertia torque $T_I$, an abrupt increase of the torque $T_{OUT}$ of the output shaft 262 as denoted by the arrow A is prevented, whereby the shifting shock is advantageously minimized.

In the vehicle control apparatus constructed according to the present embodiment described above, when the rotational speed $N_E$ or inertia torque $T_I$ of the engine 210 is changed (reduced) by the engine 210 itself during the shifting action of the automatic transmission 217, the required torque reduction amount determined by the required torque-reduction-amount determining means 284 is modified by the required torque-reduction-amount modifying means 290, on the basis of the status of the change of the engine rotational speed $N_E$ made by the engine 210 itself, or on the basis of the status of the reduction of the inertia torque $T_I$ made by the engine 210 itself. In this arrangement, the required torque reduction amount is changed by an amount corresponding to the amount of the self-change of the engine rotational speed $N_E$, which can be done relatively rapidly. That is, owing to this arrangement, the engine output torque $T_E$ can be changed to such an extent that sufficiently reduces the shifting shock of the transmission 217, without suffering from a limitation in an amount of retarding of an ignition timing of the engine 210, namely, without suffering from a limitation in an amount of the change of the engine output torque $T_E$ and a limitation in the timing at which the output torque $T_E$ is to be changed.

Further, in the vehicle control apparatus of the present embodiment in which the required torque reduction amount is modified on the basis of the amount of the change of the inertia torque $T_I$ of the engine 210, it is possible to prevent deterioration of efficiency of clean-up of an exhaust gas, and other problems that could be caused as a result of change in a lift, duration and/or opening timing of at least one of intake and exhaust valves 74, 75, which change is made for the purpose of increasing the resistance to the rotary motion of the engine 210.

Further, in the vehicle control apparatus of the present embodiment, the engine 210 is equipped with the rotational-speed self-changing device including the electromagnetic actuators 76, 77 for electromagnetically actuating the respective intake and exhaust valves 74, 75, and the valve drive control device 81 activated by the engine-speed self-changing means 288 to control the electromagnetic actuators 76, 77. The valve drive control device 81 controls the lift, duration and/or opening timing of each of the intake and exhaust valves 74, 75, in such a manner that increases the resistance to the rotary motion of the crankshaft 79 of the engine 210. This arrangement permits the rotational speed $N_E$ of the engine 210 to be changed within a relatively wide range with a relatively high response.

While some embodiments of this invention have been described above, the present invention may be otherwise embodied.

While the application of the present invention to the shift-up action of the transmission in which the engine rotational speed $N_E$ is reduced depending upon the change of gear ratios Y has been described above by reference to FIG. 14 by way of example, the principle of the present invention is equally applicable to any shift-down action of the transmission in which the engine rotational speed $N_E$ is increased. In such a shift-down action, the engine output torque $T_E$ and the engine rotational speed $N_E$ are changed differently from those in the shift-up action.

In the illustrated embodiments, the engaging pressure $P_{B2}$ of the brake B2 is regulated indirectly by the line pressure $P_L$, which is adjusted to the value corresponding to the input torque $T_{IN}$ of the automatic transmission, in the process of the clutch-to-clutch 2–3 shift-up action. However, in this instance, the engaging pressure $P_{B2}$ of the brake B2 may be regulated directly by a liner solenoid valve.

In the illustrated embodiments, the engaging pressure $P_{B2}$ of the brake B2 is regulated based on the input torque $T_{IN}$ of the transmission in the process of the 2–3 shift-up action. However, the engaging pressures of any other hydraulically-operated frictional coupling devices (for effecting the other shifting actions), the lock-up clutch and a transferring or center differential device may be regulated similarly based on the input torque $T_{IN}$.

In the illustrated embodiments, the engine is operable in a selected one of the 2-cycle and 4-cycle operating modes. However, the engine does not have to be necessarily operable in a selected one of the plurality of operating modes.

In the illustrated embodiments, the rotational speed self-changing device for effecting the self-change of the engine rotational speed $N_E$ is constituted by the electromagnetic actuators 76, 77 for electromagnetically actuating the intake and exhaust valves 74, 75. However, the rotational-speed self-changing device may be constituted by a cam mechanism which is capable of automatically controlling at least one of the lift, the duration and the opening time of the intake and exhaust valves 74, 75. It is noted that the opening and closing of both of the intake and exhaust valves 74, 75 do not have to be necessarily changed and that the opening and closing of only one of the valves 74, 75 may be changed.

In the illustrated embodiments, the automatic transmission 16, to which the output of the engine 10 is inputted, consists of the planetary-gear type transmission having the plurality of forward drive positions. However, the transmission may include a continuously variable transmission which includes a pair of variable-diameter pulleys and a transmission belt connecting the pair of pulleys.

Figure 27:
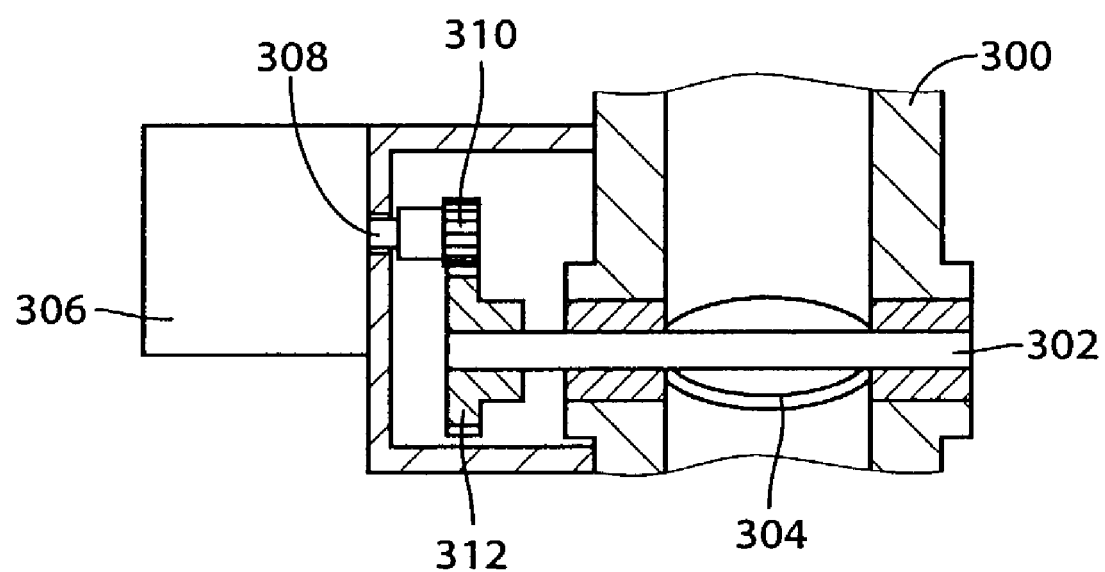
FIG. 27 is a view illustrating a modified arrangement of the variable valve mechanism provided for each cylinder of the engine.

Although the turbocharger 54 is provided in the engine in the illustrated embodiments, the provision of the turbocharger 54 in the engine is not essential. Further, although the intake and exhaust valves 74, 75 of the engine are electromagnetically actuated by the respective electromagnetic actuators 76, 77 in the illustrated embodiments, the intake and exhaust valves 74, 75 may be actuated by motor actuators as shown in FIG. 27 by way of example. In this modified arrangement, a pivot shaft 302 is provided in an intake passage 300 of the engine such that the pivot shaft 302 is pivotable about its axis which extends in a direction perpendicular to a flow direction of a air-fuel mixture. An intake valve 304 consisting of a disk-shaped member is fixed to the pivot shaft 302, so that the intake passage 300 is opened and closed by the disk-shaped intake valve 304. An electric motor 306, which is provided to be fixed to a member defining the intake passage 300, has an output shaft 308 on which a, pinion 310 is mounted. The pinion 310 meshes with a gear 306 mounted on an axial end portion of the pivot axis 302, so that the pivot shaft 302 is pivoted by actuation of the electric motor 306, for thereby opening and closing the intake passage 300.

While a fluid-operated power transmitting device is not provided in the drive system of FIG. 19, the fluid-operated power transmitting device (such as fluid coupling or torque converter equipped with a lock-up clutch) may be disposed between the engine 210 and the automatic transmission 217. In this case, the required torque-reduction-amount determining means 284 may be adapted to determine a required reduction amount by which the engine output torque $T_E$ is to be temporarily reduced upon switching of the lock-up clutch 26 from its released or slipping state to its engaged state. This reduction of the engine output torque $T_E$ is achieved by outputting the determined required reduction amount to the above-described torque reducing device 143, for temporarily restraining the input torque $T_{IN}$ ($=T_E+T_I$) which is inputted from the engine 10 whose rotational speed is reduced in the shifting action, namely, for temporarily reducing the output torque $T_E$ included in the input torque $T_{IN}$ so as to alleviate a shifting shock of the transmission caused by a torque fluctuation. The engine-speed self-changing means 288 may be adapted to generate a speed self-changing command for causing the engine 210 to change the rotational speed $N_E$ and the inertia torque $T_I$ by itself, during the switching of the lock-up clutch 26 from its released or slipping state to its engaged state, i.e., during a period when the required torque reduction amount is being outputted to the torque reducing device 143 from the required torque-reduction-amount determining means 284. The speed self-changing command is outputted to the valve drive control device 81 of the rotational-speed self-changing device, so that the rotational speed $N_E$ and the inertia torque $T_I$ are reduced owing to a rotation resistance generated by the engine 210 itself.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A control apparatus for an automotive vehicle having an automatic transmission and an engine capable of changing a rotational speed thereof by itself, said control apparatus changing an output torque of said engine temporarily during a shifting action of said automatic transmission, said control apparatus comprising:
   required torque-change-amount determining means for determining a required amount by which said output torque is to be changed temporarily during said shifting action;
   engine-speed self-changing means for causing said engine to change said rotational speed by itself during said shifting action; and
   required torque-change-amount modifying means for modifying said required amount, on the basis of change of said rotational speed of said engine caused by said engine-speed self-changing means.

2. A control apparatus according to claim 1, wherein said required torque-change-amount modifying means modifies said required amount, on the basis of an amount of said change of said rotational speed of said engine caused by said engine-speed self-changing means.

3. A control apparatus according to claim 1, wherein said required torque-change-amount determining means determines a required reduction amount by which said output torque is to be reduced temporarily during a shift-up action of said automatic transmission, wherein said engine-speed self-changing means causes said engine to reduce said rotational speed by itself during said shift-up action, and wherein said required torque-change-amount modifying means modifies said required reduction amount, on the basis of an amount of reduction of said rotational speed of said engine caused by said engine-speed self-changing means.

4. A control apparatus according to claim 3, wherein said engine includes a rotational-speed self-changing device operable to change said rotational speed, said rotational-speed self-changing device including an electromagnetic actuator for electromagnetically actuating at least one of intake and exhaust valves of said engine, and a valve drive control device for controlling said electromagnetic actuator so as to control opening and closing of said at least one of intake and exhaust valves such that said rotational speed is reduced during said shift-up action.

5. A control apparatus according to claim 4, wherein said valve drive control device controls at least one of a lift of said at least one of intake and exhaust valves, a duration over which said at least one of intake and exhaust valves is open, and an opening timing of said at least one of intake and exhaust valves.

6. A control apparatus according to claim 3, wherein said required torque-change-amount modifying means reduces said required reduction amount by a larger amount when said amount of said reduction of said rotational speed of said engine is relatively large, than when said amount of said reduction of said rotational speed of said engine is relatively small.

7. A control apparatus according to claim 1, wherein said automatic transmission includes a planetary gear device.

8. A control apparatus for an automotive vehicle having an automatic transmission and an engine capable of changing a rotational speed thereof by itself, said control apparatus changing an output torque of said engine temporarily during a shifting action of said automatic transmission, said control apparatus comprising:
   required torque-change-amount determining means for determining a required amount by which said output torque is to be changed temporarily during said shifting action;
   engine-speed self-changing means for causing said engine to change said rotational speed by itself during said shifting action; and
   engine-speed-change-amount modifying means for modifying a rotational-speed change amount by which said rotational speed is to be changed, on the basis of change of said output torque of said engine.

9. A control apparatus according to claim 8, wherein said engine-speed-change-amount modifying means modifies said rotational-speed change amount by which said rotational speed is to be changed, on the basis of an amount of said change of said output torque of said engine.

10. A control apparatus according to claim 8, wherein said required torque-change-amount determining means determines a required reduction amount by which said output torque is to be reduced temporarily during a shift-up action of said automatic transmission, wherein said engine-speed self-changing means causes said engine to reduce said rotational speed by itself during said shift-up action, and wherein said engine-speed-change-amount modifying means modifies a rotational-speed reduction amount by which said rotational speed is to be reduced, on the basis of reduction of said output torque of said engine.

11. A control apparatus according to claim 10, wherein said engine speed-change-amount modifying means modifies said rotational-speed reduction amount such that said rotational-speed reduction amount is made larger when the reduction of said output torque is restricted, than when the reduction of said output torque is not restricted.

12. A control apparatus according to claim 11, wherein said reduction of said output torque is restricted when a temperature of a coolant water of said engine is smaller than a predetermined threshold.

13. A control apparatus according to claim 11, wherein said reduction of said output torque is restricted when retarding of an ignition timing of said engine is inhibited.

14. A control apparatus according to claim 10, wherein said engine includes a rotational-speed self-changing device operable to change said rotational speed, said rotational-speed self-changing device including an electromagnetic actuator for electromagnetically actuating at least one of intake and exhaust valves of said engine, and a valve drive control device for controlling said electromagnetic actuator so as to control opening and closing of said at least one of intake and exhaust valves such that said rotational speed is reduced during said shift-up action.

15. A control apparatus according to claim 14, wherein said valve drive control device controls at least one of a lift of said at least one of intake and exhaust valves, a duration over which said at least one of intake and exhaust valves is open, and an opening timing of said at least one of intake and exhaust valves.

16. A control apparatus according to claim 8, wherein said automatic transmission includes a planetary gear device.

17. A control apparatus according to claim 1, further comprising engine speed self reduction feasibility determining means for determining whether the vehicle is placed in a state that permits said engine to reduce the rotational speed by itself.

* * * * *